US009181360B2

(12) United States Patent
Holtcamp et al.

(10) Patent No.: US 9,181,360 B2
(45) Date of Patent: Nov. 10, 2015

(54) POLYMERS PREPARED BY RING OPENING / CROSS METATHESIS

(75) Inventors: Matthew W. Holtcamp, Huffman, TX (US); John R. Hagadorn, Houston, TX (US); Caol P. Huff, Houston, TX (US); Matthew S. Bedoya, Humble, TX (US); Catherine Anne Faler, Clinton, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 104 days.

(21) Appl. No.: 13/209,242

(22) Filed: Aug. 12, 2011

(65) Prior Publication Data

US 2013/0041122 A1 Feb. 14, 2013

(51) Int. Cl.
| | |
|---|---|
| C08G 61/08 | (2006.01) |
| C08F 4/80 | (2006.01) |
| C07C 13/11 | (2006.01) |
| C08F 32/08 | (2006.01) |
| C08F 136/20 | (2006.01) |
| C10M 107/10 | (2006.01) |
| C08F 8/04 | (2006.01) |

(52) U.S. Cl.
CPC . *C08F 4/80* (2013.01); *C08F 32/08* (2013.01); *C08F 136/20* (2013.01); *C10M 107/10* (2013.01); *C08G 2261/1642* (2013.01); *C08G 2261/3325* (2013.01); *C08G 2261/418* (2013.01); *C10M 2205/0285* (2013.01); *C10N 2270/00* (2013.01)

(58) Field of Classification Search
USPC ............... 526/171, 281, 282, 283; 525/332.1, 525/915; 585/20, 507, 940, 254, 353; 524/553, 554
See application file for complete search history.

(56) References Cited

U.S. PATENT DOCUMENTS

| | | | |
|---|---|---|---|
| 4,377,663 A | 3/1983 | Wakabayashi | |
| 4,988,764 A | 1/1991 | Nishio et al. | |
| 5,182,405 A | 1/1993 | Arduengo, III | |
| 5,312,940 A | 5/1994 | Grubbs et al. | |
| 5,342,909 A | 8/1994 | Grubbs et al. | |
| 5,710,298 A | 1/1998 | Grubbs et al. | |
| 5,726,334 A | 3/1998 | Beatty et al. | |
| 5,728,839 A | 3/1998 | Herrmann et al. | |
| 5,728,917 A | 3/1998 | Grubbs et al. | |
| 5,750,815 A | 5/1998 | Grubbs et al. | |
| 5,831,108 A | 11/1998 | Grubbs et al. | |
| 5,840,238 A | 11/1998 | Setiabudi et al. | |
| 5,917,071 A | 6/1999 | Grubbs et al. | |
| 5,936,100 A | 8/1999 | Furstner et al. | |
| 6,001,909 A | 12/1999 | Setiabudi | |
| 6,025,496 A | 2/2000 | Herrmann et al. | |
| 6,100,323 A | 8/2000 | Setiabudi et al. | |
| 6,177,464 B1 | 1/2001 | Cuny et al. | |
| 6,225,432 B1 | 5/2001 | Weng et al. | |
| 6,306,988 B1 | 10/2001 | Grubbs et al. | |
| 6,323,296 B1 | 11/2001 | Warner et al. | |
| 6,500,975 B1 | 12/2002 | Schwab et al. | |
| 6,613,910 B2 | 9/2003 | Grubbs et al. | |
| 6,737,531 B1 | 5/2004 | Dioumaev et al. | |
| 6,803,429 B2 | 10/2004 | Morgan et al. | |
| 7,022,789 B2 | 4/2006 | Maughon et al. | |
| 7,119,216 B2 | 10/2006 | Newman et al. | |
| 7,205,424 B2 | 4/2007 | Nolan | |
| 7,268,242 B2 | 9/2007 | Pederson et al. | |
| 7,294,717 B2 | 11/2007 | Herrmann et al. | |
| 7,312,331 B2 | 12/2007 | Bertrand et al. | |
| 7,329,758 B1 | 2/2008 | Grubbs et al. | |
| 8,283,419 B2 | 10/2012 | Hagadorn et al. | |
| 2002/0015519 A1 | 2/2002 | Tokas et al. | |
| 2002/0111446 A1* | 8/2002 | Mukerjee et al. | 526/169 |
| 2003/0100782 A1 | 5/2003 | Grubbs et al. | |
| 2004/0131850 A1 | 7/2004 | Hedden | |
| 2004/0225073 A1 | 11/2004 | Angeletakis et al. | |
| 2005/0176906 A1* | 8/2005 | Maughon et al. | 526/264 |
| 2005/0261451 A1 | 11/2005 | Ung et al. | |
| 2007/0043180 A1 | 2/2007 | Zhan | |
| 2008/0064891 A1 | 3/2008 | Lee | |
| 2012/0077945 A1 | 3/2012 | Holtcamp et al. | |
| 2012/0309998 A1* | 12/2012 | Holtcamp et al. | 556/20 |

FOREIGN PATENT DOCUMENTS

| | | |
|---|---|---|
| EP | 0 424 833 | 5/1991 |
| EP | 1 693 357 | 8/2006 |
| WO | 97/20865 | 6/1997 |
| WO | 97/29135 | 8/1997 |
| WO | WO 98/40373 | 9/1998 |
| WO | 02/26857 | 4/2002 |
| WO | 2006/138166 | 12/2006 |
| WO | 2008/010961 | 1/2008 |
| WO | 2008/046106 | 4/2008 |

(Continued)

OTHER PUBLICATIONS

Ortega et al., "Molecular Modeling of Metathesis Degradation of Polyalkenamers 1. Degradation of Polynorbornene Via Cross-Matathesis With Linear Olefins", Polymer Degradation and Stability, 2004, vol. 86, pp. 85-93.
Christopher et al., "Living Ring-Opening Metathesis Polymerization", Progress in Polymer Science, 2007, vol. 32, pp. 1-29.
Amin et al., "*Versatile Pathways for In Situ Polyolefin*", Angewandte Chemie, Int. Ed., 2008, vol. 47, pp. 2006-2025.
Chung, "*Synthesis of Functional Polyolefin Copolymers with Graft and Block Structures*", Progress in Polymer Science, 2002, vol. 27, No. 11, pp. 39-85.
La et al., "*Tandem Catalytic Asymmetric Ring-Opening Metathesis/ Cross Metathesis*", Journal of the American Chemical Society, 1999, vol. 121, No. 49, pp. 11603-11604.
Lopez et al., "*Synthesis of Well-defined Polymer Architectures by Successive Catalytic Olefin Polymerization and Living/Controlled Polymerization Reactions*", Progress Polymer Science, 2007, vol. 32, No. 4, pp. 419-454.
Mathers et al., "*Cross Metathesis Functionalization of Polyolefins*", Chem. Commun., 2004 , No. 4, pp. 422-423.
Ornelas et al., "*Cross Olefin Metathesis for the Selective Functionalization, Ferrocenylation, and Solubilization in Water of Olefin-Terminated Dendrimers, Polymers, and Gold Nanoparticles and for a Divergent Dendrimer Construction*", Journal of the American Chemical Society, 2008, vol. 130, No. 4, pp. 1495-1506.

(Continued)

*Primary Examiner* — Fred M Teskin

(57) ABSTRACT

This invention relates to a process for producing a polymer of a cyclic olefin and a linear mono-olefin, the process comprising contacting at least one $C_5$ based cyclic olefin with at least one linear mono-olefin having from two to twenty carbon atoms in the presence of an alkene metathesis catalyst, and the polymer so produced.

63 Claims, 1 Drawing Sheet

(56) References Cited

FOREIGN PATENT DOCUMENTS

| WO | 2008/095785 | 8/2008 |
|---|---|---|
| WO | 2008/125568 | 10/2008 |
| WO | 2008/140468 | 11/2008 |

OTHER PUBLICATIONS

Ornelas et al., "*Efficient Mono- and Bifunctionalization of Polyolefin Dendrimers by Olefin Metathesis*", Angewandte Chemie, Int. Ed., 2005, vol. 44, No. 45, pp. 7399-7404.
Walker et al., "*The Living ROMP of trans-Cyclooctene*", Macromolecules, 2009, vol. 42, No. 3, pp. 599-605.
Hu et al., "Ring-Opening Metathesis Polymerization (ROMP) of Norbornene in Supercritical Carbon Dioxide Using Well-Defined Metal Carbene Catalysts", Polymers for Advanced Technologies, 2005, vol. 16, No. 2/03, pp. 146-149.
U.S. Appl. No. 61/025,076, filed Jan 31, 2008, Hagemeister et al.
U.S. Appl. No. 61/203,523, filed Dec. 23, 2008, Wu et al.
U.S. Appl. No. 61/259,514, filed Nov. 9, 2009, Hagadorn et al.
U.S. Appl. No. 61/259,521, filed Nov. 9, 2009, Hagadorn et al.
U.S. Appl. No. 61/314,388, filed Mar. 16, 2010, Holtcamp et al.
U.S. Appl. No. 61/376,925, filed Aug. 25, 2010, Holtcamp et al.
U.S. Appl. No. 12/143,663, filed Jun. 20, 2008, Brant et al.
U.S. Appl. No. 12/487,739, filed Jun. 19, 2009, Brant et al.
U.S. Appl. No. 12/488,066, filed Jun. 19, 2009, Brant et al.
U.S. Appl. No. 12/488,903, filed Jun. 19, 2009, Hagadorn et al.
U.S. Appl. No. 12/705,136, filed Feb. 12, 2010, Holtcamp et al.
U.S. Appl. No. 12/660,815, filed Mar. 4, 2010, Wang et al.
Alder, "Bis(diisopropylamino)carbene," Angew. Chem. Int. Ed., 1996, vol. 35, No. 10, pp. 1121-1128.
Anderson et al., "Synthesis and Reactivity of Olefin Metathesis Catalysts Bearing Cyclic (Alkyl)(Amino)Carbenes," Angew. Chem. Int. Ed., 2007, vol. 46, pp. 7262-7265.
Anderson et al., "Kinetic Selectivity of Olefin Metathesis Catalysts Bearing Cyclic (Alkyl)(Amino)Carbenes," Organometallics, 2008, vol. 27, pp. 563-566.
Belderrain et al., "Reaction between Ruthenium (0) Complexes and Dihalo Compounds. A New Method for the Synthesis of Ruthenium Olefin Metathesis Catalysts," Organometallics, 1997, vol. 16, No. 18, pp. 4001-4003.
Bergens et al., A Ruthenium-Dihydrogen Putative Intermediate in Ketone Hydrogenation, Journal of American Chemical Society, 2005, vol. 127, No. 12, pp. 4152-4153.
Berlin et al., "Highly Active Chiral Ruthenium Catalysts for Asymmetric Cross- and Ring-Opening Cross-Metathesis," Angew. Chem. Int. Ed., 2006, vol. 45, pp. 7591-7595.
Bourissou et al., "Stable Carbenes," Chem. Rev., 2000, vol. 100, No. 1, pp. 39-91.
Burdett et al., "Renewable Monomer Feedstocks via Olefin Metathesis: Fundamental Mechanistic Studies of Methyl Oleate Ethenolysis with the First-Generation Grubbs Catalyst", Organometallics 2004, vol. 23, No. 9, pp. 2027-2047.
Chaudret et al., "Preparation of Polyhydride Complexes of Ruthenium by Direct Hydrogenation of Zerovalent Olefinic Derivatives. Mononuclear Complexes of the Type RuH6L2 and RuH4L3. Spontaneous H-D Exchange between the Phosphine Protons and the Solvent Catalyzed by RuH4L3," Organometallics, 1985, vol. 4, No. 10, pp. 1722-1726.
Christ et al., "Synthesis, Characterization, and Chemistry of a 16-Electron Dihydrogen Complexes of Ruthenium," Organometallics, 1994, vol. 13, No. 10, pp. 3800-3804.
Crowe et al., "Chain Transfer Agents for Living Ring-Opening Metatthesis Polymerization Reactions of Norbornene," Macromolecules, 1990, vol. 23, No. 14, pp. 3534-3536.
Cucullu et al., "Catalytic Dehalogenation of Aryl Chlorides Mediated by Ruthenium (II) Phosphine Complexes," Organometallics, 1999, vol. 18, No. 7, pp. 1299-1304.
Enders et al., "Preparation, Structure, Reactivity of 1,3,4-Triphenyl-4,5-dihydro-1H-1,2,4-triazol-5-ylidene, a New Stable Carbene," Angew. Chem. Int. Ed., 1995, vol. 34, No. 9, pp. 1021-1023.
Fogg et al., Carbonyl-Amplified Catalyst Performance: Balancing Stability Against Activity for Five-Coordinate Ruthenium Hydride and Hydridocarbonyl Catalysts, Organometallics, 2009, vol. 28, No. 2, pp. 441-447.
Hermann et al., "Nickel (II) Complexes of N- Heterocyclic Carbenes," Organometallics, 1997, vol. 16, No. 10, pp. 2209-2212.
Hermann et al., "N-Heterocyclic Carbenes," Angew. Chem. Int. Ed., 1997, vol. 36, pp. 2163-2187.
Hermann et al., "Heterocyclic Carbenes [+] A High-Yielding Synthesis of Novel Functionalized N-Heterocyclic Carbenes in Liquid Ammonia," Chem. Eur. J., 1996, vol. 2, No. 12, pp. 1627-1635.
Herrmann et al., "N-Heterocyclic Carbenes [+]: Generation under Mild Conditions and Formation of Group 8-10 Transition Metal Complexes Relevant to Catalysis," Chem. Eur. J., 1996, vol. 2, No. 7, pp. 772-780.
Holmes et al., "Some Reactions of Tungsten Methylidyne Complexes and the Crystal Structure of [W2(CPMe3)2(PMe3)4][AlCl4]2," Organometallics, 1984, vol. 3, No. 3, pp. 476-484.
Jacobsen, "P-Heterocyclic Carbenes as Potential Ligands in the Design of New Metathesis Catalysts. A Computational Study", The Royal Society of Chemistry, Dalton Translations, 2006, vol. 18, pp. 2214-2224.
Jazzar et al., "Intramolecular 'Hydroiminiumation' of Alkenes: Applications to the Synthesis of Conjugate Acids of Cyclic Alkyl Amino Carbenes (CAACs)," Angew. Chem. Int. Ed., 2007, vol. 46, No. 16, pp. 2899-2902.
Jazzar et al., "A New Synthetic Method for the Preparation of Protonated-HNCs and Related Compounds," J. Organometallic Chemistry, 2006, vol. 691, No. 14, pp. 3201-3205.
Kingsbury et al., "A Recyclable Ru-Based Metathesis Catalyst", J. Am. Chem. Soc. 1999, vol. 121, No. 4, pp. 791-799.
Lavallo et al., "Stable Cyclic (Alkyl)(Amino)carbenes as Rigid and Flexible, Bulky Electron-Rich Ligands for Transition Metal Catalysts: A Quaternary Carbon Atom Makes the Difference," Angew. Chem. Int. Ed., 2005, vol. 44, No. 35, pp. 5705-5709.
Lavallo et al., "A Rigid Cyclic (Alkyl)(Amino)carbene Ligand Leads to Isolation of Low-Coordinate Transition Metal Complexes," Angew. Chem. Int. Ed., 2005, vol. 44, No. 44, pp. 7236-7239.
Mathew et al., "Assessment of Stereoelectronic Effects in Grubbs First-Generation Olefin Metathesis Catalysis Using Molecular Electrostatic Potential", Organometallics, 2011, vol. 30, No. 6, pp. 1438-1444.
Pereira da Silva et al., "Investigation of the Catalysis Mechanism of ROMP of Norbornene Using Density Functional Theory", Quimica Nova, 2010, vol. 33, No. 7, pp. 1444-1448 (Abstract only).
Randall et al., "Selective Ring-Opening Cross-Metathesis. Short Synthesis of Multifidene and Viridiene", Journal of American Chemical Society, 1995, vol. 117, No. 37, pp. 9610-9611.
Sliwa et al., "Assessment of Density Functional Methods for the Study of Olefin Metathesis Catalysed by Ruthenium Alkylidene Complexes", Chemical Physics Letters, 2010, vol. 493, Nos. 4-6, pp. 273-278.
Stuer et al., A Tertiary Phosphine that is too Bulky: Preparation of Catalytically Less Active Carbene and Vinylidene Ruthenium(II) Complexes, Journal of Organometallic Chemistry, Elsevier-Sequoia S.A. Lausanne, CH, 2002, vol. 641, No. 1-2, pp. 203-207.
Tupy et al., Final Technical Report entitled "Platform Chemicals from an Oilseed Biorefinery", Grant No. DE-FG36-04GO14016, awarded by the Department of Energy, (Dated Nov. 30, 2006).
Wilhelm et al., "Reactivity of Ru(H)(H2)Cl(PCy3)2 with Propargyl and Vinyl Chlorides: New Methodology to Give Metathesis-Active Ruthenium Carbenes", Organometallics, 1997, No. 16, No. 18, pp. 3867-3869.

* cited by examiner

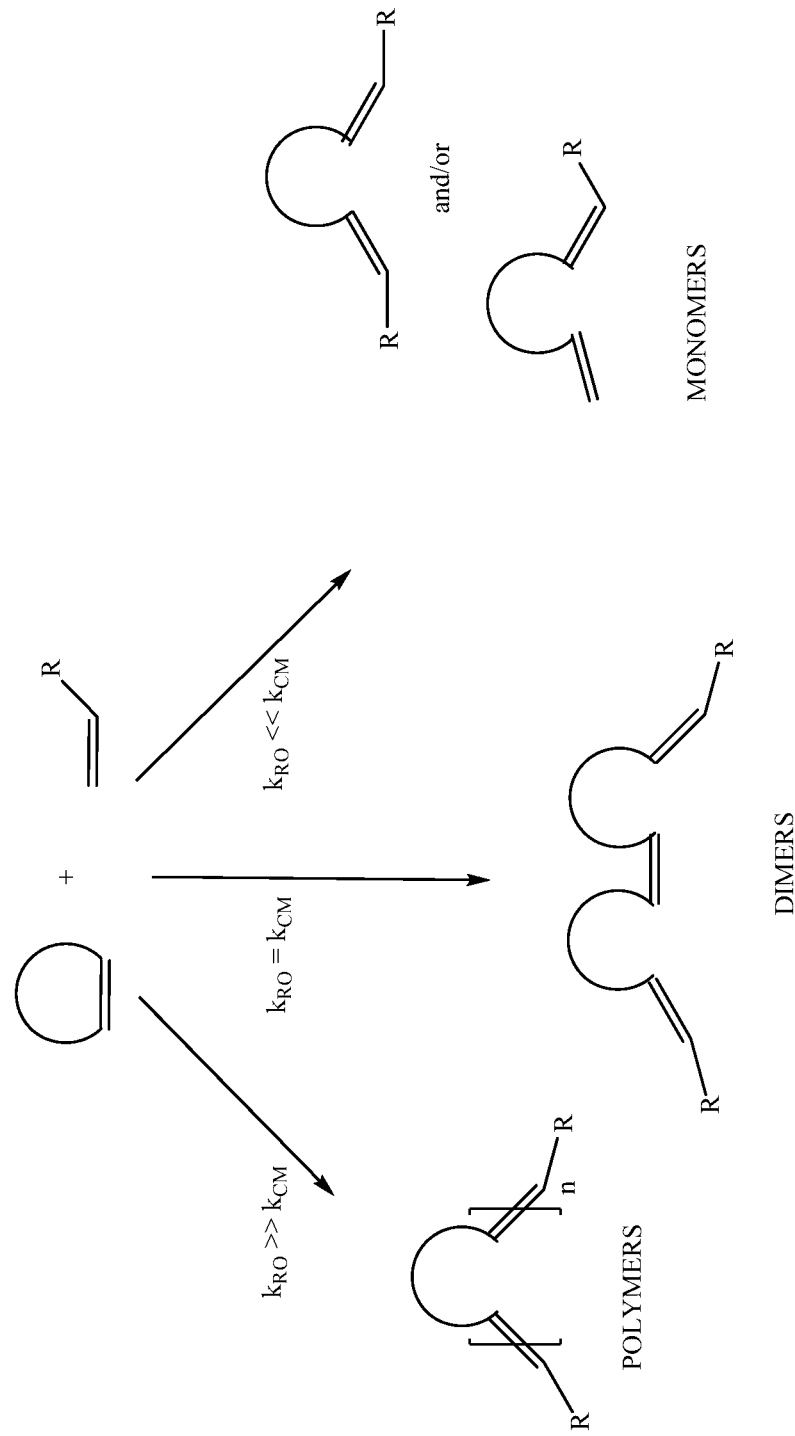

POLYMERS PREPARED BY RING OPENING / CROSS METATHESIS

FIELD OF THE INVENTION

This invention relates to metathesis preparation of polymers from cyclic monomers and linear mono-olefins.

BACKGROUND OF THE INVENTION

Metathesis is generally thought of as the interchange of radicals between two compounds during a chemical reaction. There are several varieties of metathesis reactions, such as ring opening metathesis, acyclic diene metathesis, ring closing metathesis, and cross metathesis. These reactions, however, have had limited success with the metathesis of functionalized olefins.

Methods for the production of polyolefins with end-functionalized groups are typically multi-step processes that often create unwanted by-products and waste of reactants and energy.

R. T. Mathers and G. W. Coates, *Chem. Commun.*, 2004, pp. 422-423 disclose examples of using cross-metathesis to functionalize polyolefins containing pendant vinyl groups to form polar-functionalized products with a graft-type structure.

C. Ornelas et al., *J. Am. Chem. Soc.* 2008, 130, pp. 1495-1506, and C. Ornelas et al., *Angew. Chem. Int. Ed.*, 2005, 44, pp. 7399-7404 disclose examples of using cross metathesis to functionalize non-polymeric molecules containing vinyl groups.

For reviews of methods to form end-functionalized polyolefins, see: (a) S. B. Amin and T. J. Marks, *Angew. Chem. Int. Ed.*, 2008, 47, pp. 2006-2025; (b) T. C. Chung, *Prog. Polym. Sci.*, 2002, 27, pp. 39-85; (c) R. G. Lopez, F. D'Agosto, C. Boisson, *Prog. Polym. Sci.*, 2007, 32, pp. 419-454.

U.S. Ser. No. 12/488,093, filed Jun. 19, 2009 discloses end functionalized polyolefins prepared from vinyl terminated polyolefins by cross metathesis.

Additional references of interest include U.S. Pat. No. 4,988,764 and U.S. Pat. No. 6,225,432.

Currently, most lubricant base stocks are derived from crude oil distillate fractions by processes such as hydrocracking, catalytic dewaxing and solvent dewaxing which adjust the size and degree of branching of the distillate fractions. However, owing to the high price of crude oil and the unstable nature of the oil supply worldwide, there is an increasingly strong incentive to produce lubricant base stocks from alternative sources.

Important alternative sources of hydrocarbons available in large supply in most modern refineries include norbornene and norbornadiene since these can be produced by the Diels-Alder reaction of cyclopentadiene with ethylene and acetylene, respectively. Cyclopentadiene is itself available in large quantities as a by-product of the steam cracking of naphtha and gas oils to produce ethylene and the distillation of coal tar. There is, therefore, significant interest in developing new uses for norbornene and norbornadiene.

For example, norbornene can be converted to polynorbornene by ring-opening metathesis polymerization (ROMP) using complex ruthenium catalysts, such as a Walker' catalyst:

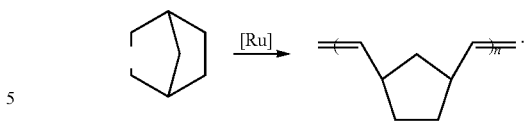

The resultant polynorbornene is used mainly in the rubber industry and usually has a high glass transition temperature and high optical clarity.

In addition, Walker and his coworkers have produced block copolymers of norbornene and cyclooctene; see *Macromolecules,* 2009, 42, 599 to 605. Further, work by La and coworkers have shown that certain molybdenum alkylidenes catalyze chain transfer of polynorbornene with dienes and styrene, see *J. Am. Chem. Soc.,* 1999, 121, 11603 to 11604. Olefins, such as 1-pentene are, however, reported to be unreactive for this chain termination.

A variation on ring-opening metathesis polymerization which has to date been the subject of only limited research is ring-open cross metathesis (ROCM). ROCM involves a tandem sequence in which a cycloolefin is opened and a second, acyclic olefin is then crossed onto the newly formed termini.

For example, U.S. Pat. No. 6,803,429 discloses that certain Group 8 metal alkylidene complexes substituted with N-heterocyclic carbine ligands catalyze the ring-opening cross-metathesis of cycloolefins with acyclic olefinic reactants, particularly α,β-unsaturated carbonyl compounds. The ROCM products are said to be mainly monomeric, dimeric or oligomeric species, rather than polymers.

Likewise, US 2008/0064891 discloses ring opening cross-metathesis reaction of cyclic olefins with seed oils and the like comprising contacting: (a) at least one olefinic substrate selected from (i) an unsaturated fatty acid, (ii) an unsaturated fatty alcohol, (iii) an esterification product of an unsaturated fatty acid with an alcohol, and (iv) an esterification product of a saturated fatty acid with an unsaturated alcohol, with (b) at least one cyclic olefin as a cross metathesis partner, in the presence of (c) a ruthenium alkylidene olefin metathesis catalyst, (d) under conditions effective to allow ring insertion cross metathesis whereby the cyclic olefin is simultaneously opened and inserted into the olefinic substrate.

Further WO98/40373 discloses ROCM on solid supports to isolate the olefin immobilized on the resin, preventing unwanted olefin polymerization.

EP 1 693 357 discloses a process for carrying out a ring opening cross-metathesis reaction between a liquid cyclic olefin and a gaseous acyclic olefin in a fixed bed system using $Re_2O_7$—$B_2O_3$/$Al_2O_3$ to produce 1,9-decadiene.

According to the present invention it has now been found that novel polymers of cyclic monomers and linear mono-olefins useful in the production of lubricant basestocks, among other things, can be produced by the ring-opening cross-metathesis of cyclic monomers (such as $C_5$ based cyclic olefins) with linear mono-olefins (such as $C_2$ to $C_{20}$ linear mono-olefins) using alkene metathesis catalysts (such as asymmetric ruthenium alkylidene complexes). In a preferred embodiment, the instant invention provides process and catalyst systems which are effective for both ring-opening polymerizations with cyclic olefins (such as $C_5$ based cyclic olefins) and cross-metathesis reactions with linear mono-olefins olefins in one reactor.

Polymers prepared by metathesis herein are of interest for use in a broad range of applications as lubricant, compatibilizers, tie-layer modifiers, surfactants, and surface modifiers, among other things. Further, hydrogenation of such leads to unique polymers that can be used in applications such as lubricants, compatibilizers, tie-layer modifiers, surfactants, and surface metathesis polymerization.

SUMMARY OF THE INVENTION

This invention relates to a polymer represented by the formula (X):

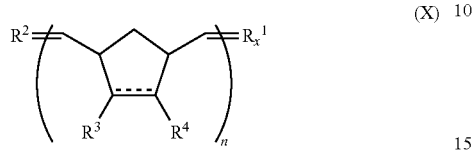

where the dotted line indicates an optional double bond; x is 0 or 1; $R^1$ and $R^2$ can be the same or different and each is a hydrocarbyl group having from one to twenty carbon atoms; $R^3$ and $R^4$ can be the same or different and each is hydrogen or a hydrocarbyl group having from one to forty carbon atoms or $R^3$ and $R^4$ may be represented by the formula (X) above, provided $R^3$ and $R^4$ may be joined to form a five-membered or six-membered ring; and n is an integer from 1 to 100.

This invention also relates to a process to produce the polymers described above.

BRIEF DESCRIPTION OF THE FIGURES

The FIGURE is a representation of some of the possible outcomes of ring opening cross metathesis.

DETAILED DESCRIPTION

The term "polyolefin" as used herein means an oligomer or polymer of two or more olefin mer units and specifically includes oligomers and polymers as defined below. An "olefin," alternatively referred to as "alkene," is a linear, branched, or cyclic compound of carbon and hydrogen having at least one double bond. A "mono-olefin" has one double bond, either alpha or internal.

A propylene polymer or oligomer contains at least 50 mol % of propylene, an ethylene polymer or oligomer contains at least 50 mol % of ethylene, and so on.

For purposes of this specification and the claims appended thereto, when a polymer or copolymer is referred to as comprising an olefin, including, but not limited to ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. The term "different" as used to refer to mer units indicates that the mer units differ from each other by at least one atom or are different isomerically. Accordingly, the definition of copolymer, as used herein, includes terpolymers and the like. An oligomer is typically a polymer having a low molecular weight (such an Mn of less than 25,000 g/mol, preferably less than 2,500 g/mol) or a low number of mer units (such as 75 mer units or less, typically 50 mer units or less, even 20 mer units or less, even 10 mer units or less).

As used herein, Mn is number average molecular weight, Mw is weight average molecular weight, and Mz is z average molecular weight, wt % is weight percent, and mol % is mole percent. Molecular weight distribution (MWD) is defined to be Mw divided by Mn. Unless otherwise noted, all molecular weight units (e.g., Mw, Mn, Mz) are g/mol. Carbon number is determined by $^1H$ NMR as set out in the Experimental section below.

As used herein, the new notation for the Periodic Table Groups is used as described in Chemical and Engineering News, 63(5), 27 (1985). Room temperature is 23° C. unless otherwise noted.

The term "substituted" means that a hydrogen group has been replaced with a hydrocarbyl group, a heteroatom or a heteroatom containing group. For example methyl cyclopentadiene is a cyclopentadiene (Cp) group substituted with a methyl group and ethyl alcohol is an ethyl group substituted with an —OH group.

The terms "hydrocarbyl radical," "hydrocarbyl" and "hydrocarbyl group" are used interchangeably throughout this document. Likewise the terms "group" and "substituent" are also used interchangeably in this document. For purposes of this disclosure, "hydrocarbyl radical" is defined to be $C_1$ to $C_{20}$ radicals, that may be linear, branched, or cyclic (aromatic or non-aromatic); and include substituted hydrocarbyl radicals as defined below.

Substituted hydrocarbyl radicals are radicals in which at least one hydrogen atom has been substituted with a heteroatom or heteroatom containing group, preferably with at least one functional group such as halogen (Cl, Br, I, F), $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like or where at least one heteroatom has been inserted within the hydrocarbyl radical, such as halogen (Cl, Br, I, F), O, S, Se, Te, $NR*$, $PR*$, $AsR*$, $SbR*$, $BR*$, $SiR*_2$, $GeR*_2$, $SnR*_2$, $PbR*_2$, and the like, where $R*$ is, independently, hydrogen or a hydrocarbyl.

A "substituted alkyl" or "substituted aryl" group is an alkyl or aryl radical made of carbon and hydrogen where at least one hydrogen is replaced by a heteroatom, a heteroatom containing group, or a linear, branched, or cyclic substituted or unsubstituted hydrocarbyl group having 1 to 30 carbon atoms.

This invention relates to a polymer represented by the formula (X):

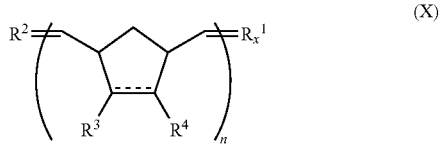

where the dotted line indicates an optional double bond; x is 0 or 1; $R^1$ and $R^2$ can be the same or different and each is a hydrocarbyl group having from 1 to 20 carbon atoms (preferably 1 to 12, preferably 1 to 6, preferably 5 carbon atoms); $R^3$ and $R^4$ can be the same or different and each is hydrogen or a hydrocarbyl group having from 1 to 40 carbon atoms (preferably 1 to 20, preferably 1 to 12, preferably 2 to 6 carbon atoms) or $R^3$ and $R^4$ may be represented by the formula (X) above, provided $R^3$ and $R^4$ may be joined to form a five-membered or six-membered ring; and n is an integer from 1 to 100 (preferably 1 to 60, preferably 1 to 20, preferably 2 to 10, preferably 2 to 5).

In a preferred embodiment, all or part of the $C_5$ ring(s) in formula (X) are saturated. In another embodiment all or part of the $C_5$ ring(s) in formula (X) are unsaturated. In another embodiment, the pentane ring(s) in formula (X) are saturated.

In another preferred embodiment, $R^1$ is a $C_{5-9}$ hydrocarbyl and $R^2$ is a $C_{5-9}$ hydrocarbyl.

In another preferred embodiment, $R^1$ is a $C_{5-9}$ hydrocarbyl, $R^2$ is a $C_{5-9}$ hydrocarbyl, $R^3$ and $R^4$ are H and n is an integer from 1 to 100 (preferably from 1 to 50, preferably from 2 to 20, preferably from 4 to 10).

In another preferred embodiment, $R^1$ is a $C_5$ or $C_9$ hydrocarbyl, $R^2$ is a $C_5$ or $C_9$ hydrocarbyl, $R^3$ and $R^4$ are H and n is an integer from 1 to 100 (preferably from 1 to 50, preferably from 2 to 20, preferably from 4 to 10).

In another preferred embodiment, $R^1$ is a $C_9$ hydrocarbyl and $R^2$ is a $C_9$ hydrocarbyl.

In another preferred embodiment, $R^1$ is a $C_9$ hydrocarbyl, $R^2$ is a $C_9$ hydrocarbyl, $R^3$ and $R^4$ are H and n is an integer from 1 to 100 (preferably from 1 to 50, preferably from 2 to 20, preferably from 4 to 10).

In another embodiment, $R^3$ and $R^4$ form a $C_5$ unsaturated cyclic group, such as cyclopentene. In another embodiment, $R^3$ and $R^4$ form a $C_5$ saturated cyclic group, such as cyclopentane. In another embodiment, $R^3$ and $R^4$ form cyclopentene and/or cyclopentane.

Ring-Opening Cross Metathesis Polymerization (ROCM)

In particular embodiments, the present invention involves a process for performing a metathesis reaction with a cyclic olefin and a linear mono-olefin. In such embodiments, the metathesis product comprises a ROCM product of the cyclic olefin and the linear mono-olefin. The wide synthetic availability of cyclic olefins makes this route attractive, and cyclic compounds are particularly important in synthesis. Most significantly, ring systems are key to stereochemical control; the understanding of ring conformation often presents the most expeditious route for stereocenter installation. The ability to take these general carbocycles to highly functionalized linear molecules (which, ideally, would have differentially protected termini) would be extremely valuable to the synthetic chemist.

The ROCM involves a tandem sequence in which a cyclic olefin is opened and a linear mono-olefin is crossed onto the newly formed termini. After the initial ring opening event, the metal-bound intermediate has two options: reaction with another cyclic olefin or reaction with the other olefin. It will be appreciated that a ROCM reaction between a cyclic olefin and a linear mono-olefin reactant can result in several different types of reaction products, depending, in large part, on the relative rates of the ring-opening metathesis reaction and the cross-metathesis reaction between the mono-olefinic reactant and the cyclic olefin, as shown in the FIGURE; where n=1 to 100,000 and R is a $C_1$ to $C_{30}$ hydrocarbyl, derived from the mono-olefin; preferably, a $C_2$ to $C_{20}$ hydrocarbyl; preferably, a $C_2$ to $C_{12}$ hydrocarbyl; preferably, methyl, ethyl, propyl, butyl, pentyl, hexyl, and substituted and cyclic analogs thereof.

Accordingly, a cyclic olefin will undergo a ring opening reaction in the presence of the catalyst at a rate constant $k_{RO}$, and the second olefin reactant will undergo a cross-metathesis reaction with the ring opened cyclic olefin at a rate constant $k_{CM}$. When $k_{CM}$ is greater than or equal to $k_{RO}$, the ROCM product is predominantly a monomer, dimer, and/or oligomer. More specifically, when $k_{CM}$ is approximately equal to $k_{RO}$, the ROCM product is predominantly a dimer or oligomer, while when $k_{RO}$ is greater than $k_{CM}$, the ROCM product is predominantly higher Mw. Dimers and oligomers are of particular interest because their internal olefin moieties may be further functionalized by metathesis or other transformations. It should be appreciated that $k_{RO}$ will be higher for moderately and highly strained cyclic olefins such as norbornadiene, but lower for low-strain olefins such as cyclopentene and cyclohexene. For example, the ROCM of norbornadiene and 1-decene in the presence of the catalysts described herein produces decene-capped oligomers of oligo(norbornadiene), as shown in the scheme below:

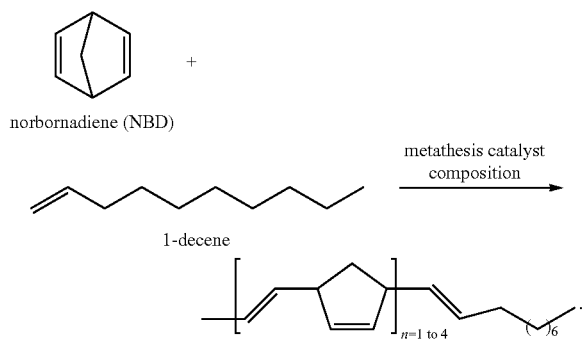

This invention also relates to a process to prepare a polymer represented by the formula (X):

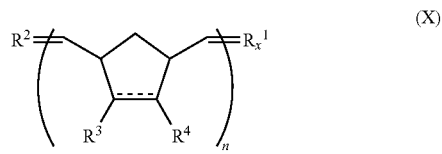

where the dotted line indicates an optional double bond; x is 0 or 1; $R^1$ and $R^2$ can be the same or different and each is a hydrocarbyl group having from 1 to 20 carbon atoms (preferably 1 to 12, preferably 1 to 6, preferably 5 carbon atoms); $R^3$ and $R^4$ can be the same or different and each is hydrogen or a hydrocarbyl group having from 1 to 40 carbon atoms (preferably 1 to 20, preferably 1 to 12, preferably 2 to 6 carbon atoms) or $R^3$ and $R^4$ may be represented by the formula (X) above, provided $R^3$ and $R^4$ may be joined to form a five-membered or six-membered ring; and n is an integer from 1 to 100 (preferably 1 to 60, preferably 1 to 20, preferably 2 to 10, preferably 2 to 5);

said process comprising contacting an alkene metathesis catalyst with a cyclic olefin (preferably a $C_5$ based cyclic olefin) and a linear mono-olefin.

The reactants (including the linear mono-olefin and the cyclic olefin) are typically combined in a reaction vessel at a temperature of 20° C. to 200° C. (preferably 50° C. to 160° C., preferably 60° C. to 140° C.) and a pressure of 0 to 1000 MPa (preferably 0.5 to 500 MPa, preferably 1 to 250 MPa) for a residence time of 0.5 seconds to 10 hours (preferably 1 second to 5 hours, preferably 1 minute to 1 hour). The molecular weight of the polymer products may be controlled by, inter alia, choice of catalyst, ratio of linear mono-olefin to cyclic olefin and/or possibly temperature.

In certain embodiments, where the olefin is a gaseous olefin, the olefin pressure is typically greater than 5 psig (34.5 kPa); preferably, greater than 10 psig (68.9 kPa); and more preferably, greater than 45 psig (310 kPa). When a diluent is used with the gaseous olefin, the aforementioned pressure ranges may also be suitably employed as the total pressure of olefin and diluent. Likewise, when a liquid olefin is employed and the process is conducted under an inert gaseous atmosphere, then the aforementioned pressure ranges may be suitably employed for the inert gas pressure.

The quantity of metathesis catalyst that is employed in the process of this invention is any quantity that provides for an operable metathesis reaction. Preferably, the ratio of moles of monomers (e.g., cyclic olefins and linear mono-olefins) to moles of metathesis catalyst is typically greater than 10:1; preferably, greater than 100:1; preferably, greater than 1,000:1; preferably, greater than 10,000:1; preferably, greater than 25,000:1; preferably, greater than 50,000:1; preferably, greater than 100,000:1.

Typically, 0.00001 to 1.0 moles, preferably 0.0001 to 0.05 moles, preferably 0.0005 to 0.01 moles of catalyst are charged to the reactor per mole of linear mono-olefin charged.

Typically, 0.00001 to 1.0 moles, preferably 0.0001 to 0.05 moles, preferably 0.0005 to 0.01 moles of catalyst are charged to the reactor per mole of cyclic olefin charged.

The ratio of linear mono-olefin monomer to cyclic olefin monomer is preferably 0.01:1 to 1000:1, preferably 1:1 to 100:1 depending on the final polymer sought. It has been noted that in the instant invention, the ratio of linear mono-olefin monomer to cyclic olefin monomer has an effect on molecular weight.

The process is typically a solution process, although it may be a bulk or high pressure process. Homogeneous processes are preferred. (A homogeneous process is defined to be a process where at least 90 wt % of the product is soluble in the reaction media.) A bulk homogeneous process is particularly preferred. (A bulk process is defined to be a process where reactant concentration in all feeds to the reactor is 70 volume % or more.) Alternately no solvent or diluent is present or added in the reaction medium, (except for the small amounts used as the carrier for the catalyst or other additives, or amounts typically found with the reactants; e.g., propane in propylene).

Suitable diluents/solvents for the process include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof such as can be found commercially (Isopar™); perhalogenated hydrocarbons, such as perfluorinated $C_{4-10}$ alkanes, chlorobenzene, and aromatic and alkylsubstituted aromatic compounds such as benzene, toluene, mesitylene, and xylene. In a preferred embodiment, aliphatic hydrocarbon solvents are preferred, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic. Preferably aromatics are present in the solvent at less than 1 wt %, preferably at 0.5 wt %, preferably at 0 wt % based upon the weight of the solvents. In another embodiment, suitable diluents/solvents also include aromatic hydrocarbons, such as toluene or xylenes, and chlorinated solvents, such as dichloromethane. In a preferred embodiment, the feed for the process comprises 60 vol % solvent or less, based on the total volume of the feed, preferably 40 vol % or less, preferably 20 vol % or less.

In another embodiment, the process is a slurry process. As used herein the term "slurry process" or "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

The process may be batch, semi-batch or continuous. As used herein, the term continuous means a system that operates without interruption or cessation. For example, a continuous process to produce a polymer would be one where the reactants are continually introduced into one or more reactors and polymer product is continually withdrawn.

Useful reaction vessels include reactors (including continuous stirred tank reactors, batch reactors, reactive extruders, pipes or pumps).

In a preferred embodiment, the productivity of the process is at least 200 g of polymer (preferably polymer represented by formula (X)) per mmol of catalyst per hour, preferably at least 5000 g/mmol/hour, preferably at least 10,000 g/mmol/hr, preferably at least 300,000 g/mmol/hr.

This invention further relates to a process, preferably an in-line process, preferably a continuous process, to produce polymer represented by formula (X), comprising introducing cyclic olefin, linear mono-olefin and alkene metathesis catalyst into a reactor, obtaining a reactor effluent containing polymer, optionally removing (such as flashing off) solvent, unused monomer and/or other volatiles, obtaining polymer then hydrogenating or functionalizing the polymer.

A "reaction zone" also referred to as a "polymerization zone" is defined as an area where activated catalysts and monomers are contacted and a polymerization reaction takes place. When multiple reactors are used in either series or parallel configuration, each reactor is considered as a separate polymerization zone. For a multi-stage polymerization in both a batch reactor and a continuous reactor, each polymerization stage is considered as a separate polymerization zone.

In a particularly preferred embodiment, alkene metathesis catalyst (such as 1-cyclohexylmethyl-3-(2,6-diisopropylphenyl)-4,5-dihydro-1H-imidazole) ruthenium (II) dichloride and/or 2-(2,6-diethylphenyl)-3,3,5,5-tetramethylpyrrolidine [2-(i-propoxy)-5-(N,N-dimethylaminosulfonyl)phenyl]methylene ruthenium dichloride) is used for ring-opening/cross metathesizing of norbornene and trans-5-decene yielding polymers as depicted below (where Cat. is a metathesis catalyst and n is from 1 to 100, preferably 1-50, preferably 1-10):

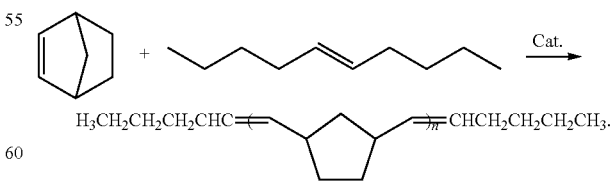

Alkene Metathesis Catalysts

An alkene metathesis catalyst is a compound that catalyzes the reaction between a cyclic olefin with a linear mono-olefin to produce a polymer represented by the formula (X).

In a preferred embodiment, the alkene metathesis catalyst is represented by the Formula (I):

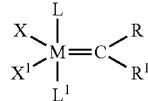

Formula (I)

where:
M is a Group 8 metal, preferably Ru or Os, preferably Ru;
X and $X^1$ are, independently, any anionic ligand, preferably a halogen (preferably chlorine), an alkoxide or a triflate, or X and $X^1$ may be joined to form a dianionic group and may form a single ring of up to 30 non-hydrogen atoms or a multinuclear ring system of up to 30 non-hydrogen atoms;
L and $L^1$ are, independently, a neutral two electron donor, preferably a phosphine or a N-heterocyclic carbene, L and $L^1$ may be joined to form a single ring of up to 30 non-hydrogen atoms or a multinuclear ring system of up to 30 non-hydrogen atoms;
L and X may be joined to form a multidentate monoanionic group and may form a single ring of up to 30 non-hydrogen atoms or a multinuclear ring system of up to 30 non-hydrogen atoms;
$L^1$ and $X^1$ may be joined to form a multidentate monoanionic group and may form a single ring of up to 30 non-hydrogen atoms or a multinuclear ring system of up to 30 non-hydrogen atoms;
R and $R^1$ are, independently, hydrogen or $C_1$ to $C_{30}$ substituted or unsubstituted hydrocarbyl (preferably a $C_1$ to $C_{30}$ substituted or unsubstituted alkyl or a substituted or unsubstituted $C_4$ to $C_{30}$ aryl);
$R^1$ and $L^1$ or $X^1$ may be joined to form a single ring of up to 30 non-hydrogen atoms or a multinuclear ring system of up to 30 non-hydrogen atoms; and
R and L or X may be joined to form a single ring of up to 30 non-hydrogen atoms or a multinuclear ring system of up to 30 non-hydrogen atoms.

Preferred alkoxides include those where the alkyl group is a phenol, substituted phenol (where the phenol may be substituted with up to 1, 2, 3, 4, or 5 $C_1$ to $C_{12}$ hydrocarbyl groups) or a $C_1$ to $C_{10}$ hydrocarbyl, preferably a $C_1$ to $C_{10}$ alkyl group, preferably methyl, ethyl, propyl, butyl, or phenyl.

Preferred phosphines are represented by the formula: $PR^{3'}R^{4'}R^{5'}$, where $R^{3'}$ is a secondary alkyl or cycloalkyl (preferably a $C_3$ to $C_{12}$ secondary alkyl or cycloalkyl), and $R^{4'}$ and $R^{5'}$ are aryl, $C_1$ to $C_{10}$ primary alkyl, secondary alkyl, or cycloalkyl. $R^{4'}$ and $R^{5'}$ may be the same or different. Preferred phosphines include $P(cyclohexyl)_3$, $P(cyclopentyl)_3$, and/or $P(isopropyl)_3$.

Preferred triflates are represented by the Formula (II):

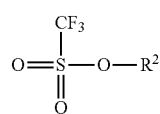

Formula (II)

where $R^2$ is hydrogen or a $C_1$ to $C_{30}$ hydrocarbyl group, preferably a $C_1$ to $C_{12}$ alkyl group, preferably methyl, ethyl, propyl, butyl, or phenyl.

Preferred N-heterocyclic carbenes are represented by the Formula (III) or the Formula (IV):

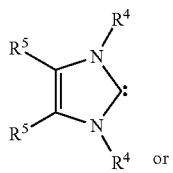

Formula (III)

or

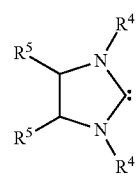

Formula (IV)

where:
each $R^4$ is independently a hydrocarbyl group or substituted hydrocarbyl group having 1 to 40 carbon atoms, preferably methyl, ethyl, propyl, butyl (including isobutyl and n-butyl), pentyl, cyclopentyl, hexyl, cyclohexyl, octyl, cyclooctyl, nonyl, decyl, cyclodecyl, dodecyl, cyclododecyl, mesityl, adamantyl, phenyl, benzyl, toluoyl, chlorophenyl, phenol, substituted phenol, or $CH_2C(CH_3)_3$; and
each $R^5$ is hydrogen, a halogen, or a $C_1$ to $C_{12}$ hydrocarbyl group, preferably hydrogen, bromine, chlorine, methyl, ethyl, propyl, butyl, or phenyl.

In other useful embodiments, one of the N groups bound to the carbene in formula (III) or (IV) is replaced with an S, O, or P atom, preferably an S atom.

Other useful N-heterocyclic carbenes include the compounds described in Hermann, W. A. Chem. Eur. J., 1996, 2, pp. 772 and 1627; Enders, D. et al. Angew. Chem. Int. Ed., 1995, 34, pg. 1021; Alder R. W., Angew. Chem. Int. Ed., 1996, 35, pg. 1121; and Bertrand, G. et al., Chem. Rev., 2000, 100, pg. 39.

In a preferred embodiment, the alkene metathesis catalyst is one or more of tricyclohexylphosphine[1,3-bis(2,4,6-trimethylphenyl)imidazol-2-ylidene][3-phenyl-1H-inden-1-ylidene]ruthenium(II) dichloride, tricyclohexylphosphine[3-phenyl-1H-inden-1-ylidene][1,3-bis(2,4,6-trimethylphenyl)-4,5-dihydro-imidazol-2-ylidene] ruthenium(II) dichloride, tricyclohexylphosphine[1,3-bis(2,4,6-trimethylphenyl)-4,5-dihydroimidazol-2-ylidene][(phenylthio)methylene]ruthenium(II) dichloride, bis(tricyclohexylphosphine)-3-phenyl-1H-inden-1-ylideneruthenium(II) dichloride, 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride, and [1,3-Bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II) chloride. In a preferred embodiment, the catalyst is 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride and/or Tricyclohexylphosphine[3-phenyl-1H-inden-1-ylidene][1,3-bis(2,4,6-trimethylphenyl)-4,5-dihydroimidazol-2-ylidene]ruthenium(II) dichloride.

In another embodiment, the alkene metathesis catalyst is represented by Formula (I) above, where: M is Os or Ru; $R^1$ is hydrogen; X and $X^1$ may be different or the same and are any anionic ligand; L and $L^1$ may be different or the same and are any neutral electron donor; and R may be hydrogen, substituted or unsubstituted alkyl, or substituted or unsubstituted aryl. R is preferably hydrogen, $C_1$ to $C_{20}$ alkyl, or aryl. The $C_1$ to $C_{20}$ alkyl may optionally be substituted with one or more aryl, halide, hydroxy, $C_1$ to $C_{20}$ alkoxy, or $C_2$ to $C_{20}$ alkoxycarbonyl groups. The aryl may optionally be substituted with one or more $C_1$ to $C_{20}$ alkyl, aryl, hydroxyl, $C_1$ to $C_5$ alkoxy, amino, nitro, or halide groups. L and $L^1$ are preferably phosphines of the formula $PR^{3'} R^{4'} R^{5'}$, where $R^{3'}$ is a secondary alkyl or cycloalkyl, and $R^{4'}$ and $R^{5'}$ are aryl, $C_1$ to $C_{10}$ primary alkyl, secondary alkyl, or cycloalkyl. $R^{4'}$ and $R^{5'}$ may be the same or different. L and $L^1$ are preferably the same and are —P(cyclohexyl)$_3$, —P(cyclopentyl)$_3$, or —P(isopropyl)$_3$. X and $X^1$ are most preferably the same and are chlorine.

In another embodiment of the present invention, the alkene metathesis catalyst is a ruthenium and/or osmium carbene compound represented by the Formula (V):

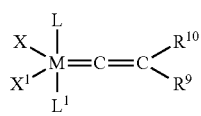

Formula (V)

where M is Os or Ru, preferably Ru; X, $X^1$, L, and $L^1$ are as described above; and $R^9$ and $R^{10}$ may be different or the same and may be hydrogen, substituted or unsubstituted alkyl, or substituted or unsubstituted aryl. The $R^9$ and $R^{10}$ groups may optionally include one or more of the following functional groups: alcohol, thiol, ketone, aldehyde, ester, ether, amine, imine, amide, nitro, carboxylic acid, disulfide, carbonate, isocyanate, carbodiimide, carboalkoxy, and halogen groups. Such compounds and their synthesis are described in, inter alia, U.S. Pat. No. 6,111,121.

In another embodiment, the alkene metathesis catalyst useful herein may be any of the catalysts described in U.S. Pat. Nos. 6,111,121; 5,312,940; 5,342,909; 7,329,758; 5,831,108; 5,969,170; 6,759,537; 6,921,735; and U.S. Patent Publication No. 2005-0261451 A1, including, but not limited to, benzylidene-bis(tricyclohexylphosphine)dichlororuthenium, benzylidene[1,3-bis(2,4,6-trimethylphenyl)-2-imidazolidinylidene]dichloro(tricyclohexylphosphine)ruthenium, dichloro(o-isopropoxyphenylmethylene)(tricyclohexylphosphine)ruthenium(II), (1,3-Bis-(2,4,6-trimethylphenyl)-2-imidazolidinylidene)dichloro(o-isopropoxyphenylmethylene)ruthenium, 1,3-Bis(2-methylphenyl)-2-imidazolidinylidene]dichloro(2-isopropoxyphenylmethylene) ruthenium(II), [1,3-Bis(2,4,6-trimethylphenyl)-2-imidazolidinylidene]dichloro[3-(2-pyridinyl)propylidene]ruthenium(II), [1,3-Bis(2-methylphenyl)-2-imidazolidinylidene]dichloro(phenylmethylene)(tricyclohexylphosphine)ruthenium(II), [1,3-Bis(2,4,6-trimethylphenyl)-2-imidazolidinylidene]dichloro(3-methyl-2-butenylidene) (tricyclohexylphosphine)ruthenium(II), and [1,3-Bis(2,4,6-trimethylphenyl)-2-imidazolidinylidene]dichloro(benzylidene)bis(3-bromopyridine)ruthenium(II).

In another embodiment, the alkene metathesis catalyst is represented by the formula:

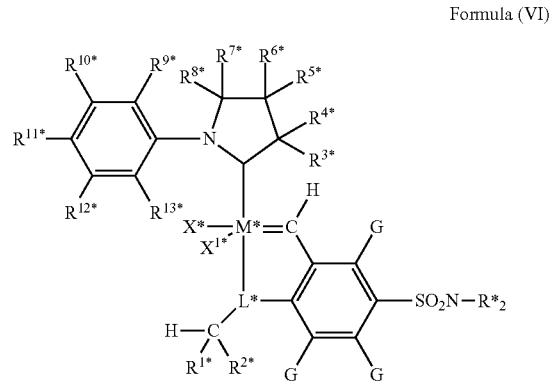

Formula (VI)

where:
$M^*$ is a Group 8 metal, preferably Ru or Os, preferably Ru;
$X^*$ and $X^{1*}$ are, independently, any anionic ligand, preferably a halogen (preferably chlorine), an alkoxide or an alkyl sulfonate, or $X^*$ and $X^{1*}$ may be joined to form a dianionic group and may form a single ring of up to 30 non-hydrogen atoms or a multinuclear ring system of up to 30 non-hydrogen atoms;
$L^*$ is N—$R^{}$, O, P—$R^{}$, or S, preferably N—$R^{}$ or O ($R^{}$ is a $C_1$ to $C_{30}$ hydrocarbyl or substituted hydrocarbyl, preferably methyl, ethyl, propyl or butyl);
$R^*$ is hydrogen or a $C_1$ to $C_{30}$ hydrocarbyl or substituted hydrocarbyl, preferably methyl;
$R^{1*}$, $R^{2*}$, $R^{3*}$, $R^{4*}$, $R^{5*}$, $R^{6*}$, $R^{7*}$, and $R^{8*}$ are, independently, hydrogen or a $C_1$ to $C_{30}$ hydrocarbyl or substituted hydrocarbyl, preferably methyl, ethyl, propyl or butyl, preferably $R^{1*}$, $R^{2*}$, $R^{3*}$, and $R^{4*}$ are methyl;
each $R^{9*}$ and $R^{13*}$ are, independently, hydrogen or a $C_1$ to $C_{30}$ hydrocarbyl or substituted hydrocarbyl, preferably a $C_2$ to $C_6$ hydrocarbyl, preferably ethyl;
$R^{10*}$, $R^{11*}$, $R^{12*}$ are, independently hydrogen or a $C_1$ to $C_{30}$ hydrocarbyl or substituted hydrocarbyl, preferably hydrogen or methyl;
each G, is, independently, hydrogen, halogen or $C_1$ to $C_{30}$ substituted or unsubstituted hydrocarbyl (preferably a $C_1$ to $C_{30}$ substituted or unsubstituted alkyl or a substituted or unsubstituted $C_4$ to $C_{30}$ aryl); and
where any two adjacent R groups may form a single ring of up to 8 non-hydrogen atoms or a multinuclear ring system of up to 30 non-hydrogen atoms.

Preferably, any two adjacent R groups may form a fused ring having from 5 to 8 non-hydrogen atoms. Preferably, the non-hydrogen atoms are C and/or O. Preferably, the adjacent R groups form fused rings of 5 to 6 ring atoms, preferably 5 to 6 carbon atoms. By adjacent is meant any two R groups located next to each other, for example $R^{3*}$ and $R^{4*}$ can form a ring and/or $R^{11*}$ and $R^{12*}$ can form a ring.

In a preferred embodiment, the alkene metathesis catalyst compound comprises one or more of: 2-(2,6-diethylphenyl)-3,5,5,5-tetramethylpyrrolidine[2-(i-propoxy)-5-(N,N-dimethylaminosulfonyl)phenyl]methylene ruthenium dichloride; 2-(mesityl)-3,3,5,5-tetramethylpyrrolidine[2-(i-propoxy)-5-(N,N-dimethylaminosulfonyl)phenyl] methylene ruthenium dichloride; 2-(2-isopropyl)-3,3,5,5-tetramethylpyrrolidine[2-(i-propoxy)-5-(N,N-dimethylaminosulfonyl)phenyl]methylene ruthenium dichloride; 2-(2,6-diethyl-4-fluorophenyl)-3,3,5,5-tetramethylpyrrolidine[2-(i-propoxy)-5-(N,N-dimethylaminosulfonyl)phenyl]methylene ruthenium dichloride, or mixtures thereof.

For further information on such alkene metathesis catalysts, please see U.S. Ser. No. 12/939,054, filed Nov. 3, 2010 (granted as U.S. Pat. No. 8,063,232), claiming priority to and the benefit of U.S. Ser. No. 61/259,514, filed Nov. 9, 2009.

Many of the above named catalysts are generally available from Sigma-Aldrich Corp. (St. Louis, Mo.) or Strem Chemicals, Inc. (Newburyport, Mass.).

In a particularly preferred embodiment, (1-cyclohexylmethyl-3-(2,6-diisopropylphenyl)-4,5-dihydro-1H-imidazole) ruthenium (II) chloride and/or 2-(2,6-diethylphenyl)-3,3,5,5-tetramethylpyrrolidine[2-(i-propoxy)-5-(N,N-dimethylaminosulfonyl)phenyl]methylene ruthenium dichloride are used as the metathesis catalyst.

In another embodiment of the present invention, the alkene metathesis catalyst is a Group 8 carbene compound represented by the Formula (VIII):

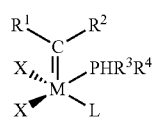

VIII wherein:
M is a Group 8 metal (preferably M is ruthenium or osmium, preferably ruthenium);
each X is independently an anionic ligand (preferably selected from the group consisting of halides, alkoxides, aryloxides, and alkyl sulfonates, preferably a halide, preferably chloride);
$R^1$ and $R^2$ are independently selected from the group consisting of hydrogen, a $C_1$ to $C_{30}$ hydrocarbyl, and a $C_1$ to $C_{30}$ substituted hydrocarbyl (preferably $R^1$ and $R^2$ are independently selected from the group consisting of methyl, ethyl, propyl, isopropyl, butyl, tert-butyl, sec-butyl, pentyl, cyclopentyl, hexyl, cyclohexyl, heptyl, octyl, cyclooctyl, and substituted analogs and isomers thereof, preferably selected from the group consisting of tert-butyl, sec-butyl, cyclohexyl, and cyclooctyl);
$R^3$ and $R^4$ are independently selected from the group consisting of hydrogen, $C_1$ to $C_{12}$ hydrocarbyl groups, substituted $C_1$ to $C_{12}$ hydrocarbyl groups, and halides (preferably $R^3$ and $R^4$ are independently selected from the group consisting of methyl, ethyl, propyl, isopropyl, butyl, tert-butyl, sec-butyl, pentyl, cyclopentyl, hexyl, cyclohexyl, heptyl, octyl, cyclooctyl, and substituted analogs and isomers thereof, preferably selected from the group consisting of tert-butyl, sec-butyl, cyclohexyl, and cyclooctyl); and
L is a neutral donor ligand, preferably L is selected from the group consisting of a phosphine, a sulfonated phosphine, a phosphite, a phosphinite, a phosphonite, an arsine, a stibine, an ether, an amine, an imine, a sulfoxide, a carboxyl, a nitrosyl, a pyridine, a thioester, a cyclic carbene, and substituted analogs thereof; preferably a phosphine, a sulfonated phosphine, an N*-heterocyclic carbene, a cyclic alkyl amino carbene, and substituted analogs thereof (preferably L is selected from a phosphine, an N-heterocyclic carbene, a cyclic alkyl amino carbene, and substituted analogs thereof). For more information on these catalysts please see U.S. Ser. No. 13/149,012, filed May 31, 2011 (granted as U.S. Pat. No. 8,524,930).

For purposes of this invention and claims thereto, a "cyclic carbene" may be defined as a cyclic compound with a neutral dicoordinate carbon center featuring a lone pair of electrons. Such cyclic carbenes may be represented by the formula (IX) below:

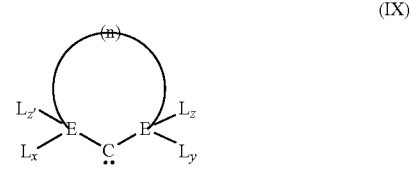

(IX)

where:
n is a linking group comprising from one to four ring vertices selected from the group consisting of C, Si, N, P, O, and S, with available valences optionally occupied by H, oxo, hydrocarbyl, or substituted hydrocarbyl groups; preferably, n comprises two ring vertices of carbon with available valences occupied by H, oxo, hydrocarbyl or substituted hydrocarbyl groups; preferably n is $C_2H_2$, $C_2H_4$, or substituted versions thereof;
each E is independently selected from the group comprising C, N, S, O, and P, with available valences optionally occupied by Lx, Ly, Lz, and Lz'; preferably, at least one E is a C; preferably, one E is a C and the other E is a N; preferably, both E's are C; and
Lx, Ly, Lz, and Lz' are independently selected from the group comprising hydrogen, hydrocarbyl groups, and substituted hydrocarbyl groups; preferably, Lx, Ly, Lz, and Lz' are independently selected from the group comprising a hydrocarbyl group and substituted hydrocarbyl group having 1 to 40 carbon atoms; preferably, Lx, Ly, Lz, and Lz' are independently selected from the group comprising $C_{1-10}$ alkyl, substituted $C_{1-10}$ alkyl, $C_{2-10}$ alkenyl, substituted $C_{2-10}$ alkenyl, $C_{2-10}$ alkynyl, substituted $C_{2-10}$ alkynyl, aryl, and substituted aryl; preferably, Lx, Ly, Lz, and Lz' are independently selected from the group comprising methyl, ethyl, propyl, butyl (including isobutyl and n-butyl), pentyl, cyclopentyl, hexyl, cyclohexyl, octyl, cyclooctyl, nonyl, decyl, cyclodecyl, dodecyl, cyclododecyl, mesityl, adamantyl, phenyl, benzyl, toluoyl, chlorophenyl, 2,6-diethylphenyl, 2,6-diisopropylphenyl, 2-isopropylphenyl, 2-ethyl-6-methylphenyl, 3,5-ditertbutylphenyl, 2-tertbutylphenyl, and 2,3,4,5,6-pentamethylphenyl. Useful substituents include $C_{1-10}$ alkyl, $C_{2-10}$ alkenyl, $C_{2-10}$ alkynyl, aryl, $C_{1-10}$ alkoxy, $C_{2-10}$ alkenyloxy, $C_{2-10}$ alkynyloxy, aryloxy, $C_{2-10}$ alkoxycarbonyl, $C_{1-10}$ alkylthio, $C_{1-10}$ alkylsulfonyl, fluoro, chloro, bromo, iodo, oxo, amino, imine, nitrogen heterocycle, hydroxy, thiol, thiono, phosphorous, and carbene groups.

Examples of cyclic carbenes useful in embodiments of the present invention include:

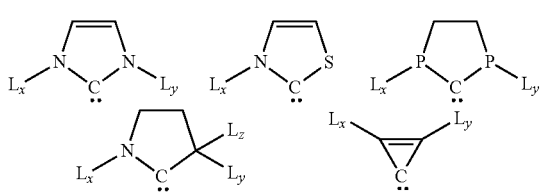

where Lx, Ly, and Lz are as defined above.
In some embodiments, at least two of Lx, Ly, Lz, and Lz' may be joined to form a 3 to 12-membered spirocyclic ring, with available valences optionally occupied by H, oxo, halogens, hydrocarbyl or substituted hydrocarbyl groups. Useful substituents include $C_{1-10}$ alkyl, $C_{2-10}$ alkenyl, $C_{2-10}$ alkynyl, aryl, $C_{1-10}$ alkoxy, $C_{2-10}$ alkenyloxy, $C_{2-10}$ alkynyloxy, aryloxy, $C_{2-10}$ alkoxycarbonyl, $C_{1-10}$ alkylthio, $C_{1-10}$ alkylsulfonyl, fluoro, chloro, bromo, iodo, oxo, amino, imine, nitrogen heterocycle, hydroxy, thiol, thiono, phosphorous, and carbene groups.

Preferred cyclic carbenes include N*-heterocyclic carbenes (N*HCs). For purposes of this invention and claims thereto, N*HCs are cyclic carbenes of the types described in Formula IX above, where each E is N and the available valences on the N are occupied by Lx and Ly. Preferred N*HCs may be represented by the formula:

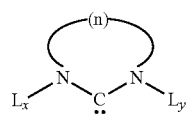

where:
n, Lx, and Ly are as described above for formula (IX).
Some particularly useful N*HCs include:

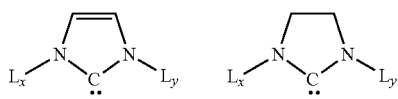

where Lx and Ly are as described above. Other useful N*HCs include the compounds described in Hermann, W. A. Chem. Eur. J. 1996, 2, 772 and 1627; Enders, D. et al., Angew. Chem. Int. Ed. 1995, 34, 1021; Alder R. W., Angew. Chem. Int. Ed. 1996, 35, 1121; U.S. Ser. No. 61/314,388; and Bertrand, G. et al., Chem. Rev. 2000, 100, 39.

Particularly preferred cyclic carbenes include cyclic alkyl amino carbenes (CAACs). In all embodiments herein, CAACs are cyclic carbenes of the types described in Formula IX above, where one E is N and the other E is C, and the available valences on the N and C are occupied by Lx, Ly, and Lz. CAACs may be represented by the formula:

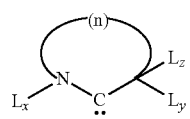

where:
n, Lx, Ly, and Lz are as described above for formula (IX).
Some particularly useful CAACs include:

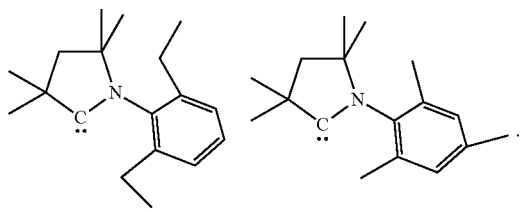

Other useful CAACs include the compounds described in U.S. Pat. No. 7,312,331; U.S. Ser. No. 61/259,514; and Bertrand et al, Angew. Chem. Int. Ed. 2005, 44, 7236-7239.

Cyclic Olefins

The cyclic olefin may be a single cyclic olefin, or a combination of cyclic olefins, that is a mixture of two or more different cyclic olefins. The cyclic olefins may be strained or unstrained, monocyclic, or polycyclic; and may optionally include heteroatoms and/or one or more functional groups. Suitable cyclic olefins include, but are not limited to norbornene, norbornadiene, dicyclopentadiene, cyclopentene, cycloheptene, cyclooctene, cyclooctadiene, cyclododecene, 7-oxanorbornene, 7-oxanorbornadiene, and substituted derivatives therefrom. Illustrative examples of suitable substituents include, but are not limited to, hydroxyl, thiol, ketone, aldehyde, ester, ether, amine, imine, amide, nitro, carboxylic acid, disulfide, carbonate, isocyanate, carbodiimide, carboalkoxy, and halogen. Preferred cyclic olefins include cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In a preferred embodiment, the cyclic olefin is a strained olefin. Alternately, the cyclic olefin is multicyclic. For clarification, dicyclopentadiene, norbornene, norbornadiene, ethylidene norbornene, and vinyl norbornene are multicyclic.

In a preferred embodiment, the cyclic olefin is a $C_5$ based cyclic olefin. A $C_5$ based cyclic olefin is an olefin (preferably, a $C_5$ to $C_{20}$ olefin) derived from substituted or unsubstituted cyclopentadiene such as dicyclopentadiene, norbornene, norbornadiene, ethylidene norbornene, vinyl norbornene, and the like.

Linear Mono-Olefins

Any linear mono-olefin may be used for the metathesis reaction described herein. For example, an alpha olefin may be used. For the purposes of this invention and the claims thereto, the term "alpha olefin" refers to an olefin where the carbon-carbon double bond occurs between the alpha and beta carbons of the chain. Alpha olefins may be represented by the formula: $H_2C=CH-R^*$, wherein each R* is independently, hydrogen or a $C_1$ to $C_{30}$ hydrocarbyl; preferably, a $C_2$ to $C_{20}$ hydrocarbyl; preferably, a $C_3$ to $C_{12}$ hydrocarbyl; preferably, methyl, ethyl, propyl, butyl, pentyl, heptyl, octyl, nonyl, decyl, undecyl, dodecyl, and substituted analogs thereof. For example, 1-pentene, 1-hexene, 1-heptene, and 1-decene are alpha olefins that are particularly useful in embodiments herein.

In other embodiments, internal olefins may be used. For the purposes of this invention and the claims thereto, the term "internal olefin" means a double bond that is not a vinyl, vinylene, or vinylidene unsaturation, preferably the term "internal olefin" refers to an olefin where the double bond does not occur between the alpha and beta carbons of the chain. Internal olefins may be represented by the formula: $R^*HC=CH-R^*$, wherein each R* is independently, a $C_1$ to $C_{30}$ hydrocarbyl; preferably, a $C_2$ to $C_{20}$ hydrocarbyl; preferably, a $C_2$ to $C_{12}$ hydrocarbyl; preferably, methyl, ethyl, propyl, butyl, pentyl, hexyl, and substituted analogs thereof. For example, hex-2-ene, hept-3-ene, dec-5-ene are particularly useful in embodiments herein.

The linear mono-olefin may also be substituted at any position along the carbon chain with one or more substituents. In some embodiments, the one or more substituents are essentially inert with respect to the metathesis process. Suitable substituents include, without limitation, alkyl, preferably, $C_{1-6}$ alkyl; cycloalkyl, preferably, $C_{3-6}$ cycloalkyl; as well as hydroxy, ether, keto, aldehyde, and halogen functionalities.

Preferred linear mono-olefins include, ethylene, propylene, butene, pentene, hexene, octene, nonene, decene undecene, dodecene, and the isomers thereof (particularly the isomers where the double bond is in the alpha position and isomers where the double bond is not in the alpha position).

Particularly preferred linear mono-olefins include dec-5-ene, 1-pentene, 1-decene, and 1-octene.

Isomers of any of the linear mono-olefins are useful herein. In some embodiments, cis and/or trans isomers may be used.

Polymer

The polymer produced herein preferably has at least 30 wt % (preferably at least 40 wt %, preferably at least 50 wt %, preferably at least 60 wt %, preferably at least 70 wt %, preferably at least 80 wt %, preferably at least 90 wt %, preferably at least 95 wt %, preferably at least 99 wt %, based upon the weight of the product produced) of C20 and higher polymers (alternately C25 to C2500, alternately C30 to C2000, alternately C40 to C1500, alternately C50 to C1000, alternately C100 to C900, alternately C200 to C800).

The polymers produced herein may be hydrogenated by contacting the polymer with hydrogen and a hydrogenation catalyst. This hydrogenation step is often used to reduce the bromine number (to preferably below 2.0, preferably below 1.8). Bromine number is determined by ASTM D 1159. In a preferred embodiment, the bromine number of the hydrogenated polymer decreases by at least 50% (preferably at least 75%) as compared to the starting polymer.

Preferably the hydrogenation catalyst is selected from the group consisting of supported Group 7, 8, 9, and 10 metals, preferably the hydrogenation catalyst selected from the group consisting of one or more of Ni, Pd, Pt, Co, Rh, Fe, Ru, Os, Cr, Mo, and W, supported on silica, alumina, clay, titania, zirconia, or mixed metal oxide supports. A preferred hydrogenation catalyst is nickel supported on kieselguhr, or platinum or palladium supported on alumina, or cobalt-molybdenum supported on alumina. Usually, a high nickel content catalyst, such as 60% Ni on Kieselguhr catalyst, is used, or a supported catalyst with high amount of Co—Mo loading. Alternately, the hydrogenation catalyst is nickel supported on Kieselguhr, silica, alumina, clay, or silica-alumina.

In a preferred embodiment, the polymer is contacted with hydrogen (preferably at a hydrogen pressure of from 25 psi to 2500 psi (0.17 MPa to 17.24 MPa), preferably from 100 to 2000 psi (0.69 MPa to 13.79 MPa)), and a hydrogenation catalyst at a temperature from 25° C. to 350° C., preferably 100° C. to 300° C., and/or a time period from 5 minutes to 100 hours, preferably from 5 minutes to 24 hours. The hydrogenation process can be accomplished in a slurry reactor in a batch operation or in a continuous stirred tank reactor (CSTR), where the catalyst, hydrogen, and the polymer are continuously added to the reactor to allow for certain residence time, usually 5 minutes to 10 hours to allow complete hydrogenation of the unsaturated olefins. The amount of catalyst added is usually very small, for example, in 0.001 wt % to 20 wt % of the polymer feed or preferably 0.01 wt % to 10 wt %, just to compensate for the catalyst deactivation. The catalyst and hydrogenated polymer are continuously withdrawn from the reactor. The product mixture may then be filtered, centrifuged or settled to remove the solid hydrogenation catalyst. The catalyst can be regenerated and reused.

The hydrogenation process can also be accomplished by a fixed bed process, in which the solid catalyst is packed inside a tubular reactor and heated to reactor temperature.

In a preferred embodiment, hydrogenation of the polymers produced herein (such as the pentene-terminated norbornene polymers) yields products useful as lubricants.

In another embodiment, a novel lubricant comprises the polymers produced in this invention, alone or together with one or more other base stocks, including Group I to Group V base stocks with viscosity range from 1.5 to 100 cSt at 100° C. to formulate suitable viscosity grades. In addition, additives of one or more of: thickeners, viscosity index improvers, antioxidants, anti-wear additives, detergent/dispersant/inhibitor packages, and/or anti-rust additives may be added. In a preferred embodiment, the polymers produced herein are combined with one or more of dispersants, detergents, friction modifiers, traction improving additives, demulsifiers, defoamants, chromophores (dyes), and/or haze inhibitors. These fully formulated lubricants can be used in automotive crank case oil (engine oil), industrial oil, grease, or gas turbine engine oil. These are examples of additives used in finished lubricant formulations. Additional information on additives used in product formulation can be found in "Lubricants and Lubrications", Ed. By T. Mang and W. Dresel, by Wiley-VCH GmbH, Weinheim 2001.

The polymers prepared herein may be functionalized by reacting a heteroatom containing group (preferably amines, aldehydes, alcohols, acids, succinic acid, maleic acid, and/or maleic anhydride) with the polymer, with or without a catalyst. Examples include catalytic hydrosilylation, hydroformylation, hydroboration, epoxidation, hydration, dihydroxylation, hydroamination, or maleation with or without activators such as free radical generators (e.g., peroxides). In some embodiments, the polymers produced herein are functionalized as described in U.S. Pat. No. 6,022,929; A. Toyota, T. Tsutsui, and N. Kashiwa, Polymer Bulletin 48, pp. 213-219, 2002; J. Am. Chem. Soc., 1990, 112, pp. 7433-7434; and U.S. Ser. No. 12/487,739 filed on Jun. 19, 2009 (Published as WO 2009/155472).

The functionalized polymers can be used in lubricant, oil additivation and many other applications.

The choice of the cyclic olefin and the linear mono-olefin used in a ROCM reaction may allow for tailoring of the resultant polymer. Use of olefins with protected functionalities, for example, TBS-protected 4-penten-1-ol, may allow for introduction of functional groups to the capped poly(cyclic olefin). Some examples of functionalized polymers include those that are functionalized with maleic acid or maleic anhydride groups. The functionalized polymers can in turn be derivatized with a derivatizing compound, such as described in U.S. Pat. No. 6,022,929; A. Toyota, T. Tsutsui, and N. Kashiwa, Polymer Bulletin 48, 213-219, 2002; and J. Am. Chem. Soc., 1990, 112, 7433-7434. The derivatizing compound can react with the functional groups of the functionalized capped polymer by any means known in the art, such as nucleophilic substitution, Mannich Base condensation, and the like. The derivatizing compound can be polar and/or contain reactive derivative groups. Preferred derivatizing compounds are selected from hydroxy containing compounds, amines, metal salts, anhydride containing compounds, and acetyl halide containing compounds. The derivatizing compounds can comprise at least one nucleophilic group and preferably at least two nucleophilic groups. An exemplary derivatized capped polymer may be made by contacting a functionalized capped polymer, for example, one substituted with a carboxylic acid/anhydride or ester, with a nucleophilic reagent, for example, amines, alcohols (including polyols), amino alcohols, reactive metal compounds and the like. (For more information please see U.S. Pat. No. 6,022,929, column 33, line 27 to column 74, line 63.)

In another embodiment, this invention relates to:

1. A polymer represented by the formula (X):

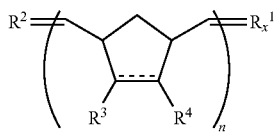

where the dotted line indicates an optional double bond; x is 0 or 1; $R^1$ and $R^2$ can be the same or different and each is a hydrocarbyl group having from 1 to 20 carbon atoms (preferably 1 to 12, preferably 1 to 6, preferably 5 carbon atoms); $R^3$ and $R^4$ can be the same or different and each is hydrogen or a hydrocarbyl group having from 1 to 40 carbon atoms (preferably 1 to 20, preferably 1 to 12, preferably 2 to 6 carbon atoms) or $R^3$ and $R^4$ may be represented by the formula (X) above, provided $R^3$ and $R^4$ may be joined to form a five-membered or six-membered ring; and n is an integer from 1 to 100 (preferably 1 to 60, preferably 1 to 20, preferably 2 to 10, preferably 2 to 5).

2. The polymer of paragraph 1, wherein $R^1$ and $R^2$ can be the same or different and each is a hydrocarbyl group having from 1 to 12 carbon atoms; $R^3$ and $R^4$ can be the same or different and each is hydrogen or a hydrocarbyl group having from 1 to 20 carbon atoms, provided $R^3$ and $R^4$ may be joined to form a five-membered or six-membered ring; and n is an integer from 1 to 60.

3. The polymer of paragraph 1 or 2, wherein $R^3$ is hydrogen and $R^4$ is an ethylidene group or wherein $R^3$ is hydrogen and $R^4$ is hydrogen.

4. The polymer of paragraph 1 or 2, wherein $R^3$ and $R^4$ form a $C_5$ or $C_6$ cyclic group, preferably a $C_5$ cyclic group, preferably pentane and/or pentene, preferably all or part of the pentane ring(s) in formula (X) are saturated, alternately all are saturated, alternately all are unsaturated.

5. The polymer of paragraph 1, 2, 3, or 4, wherein $R^1$ is a $C_{5-9}$ hydrocarbyl and $R^2$ is a $C_{5-9}$ hydrocarbyl, preferably a $C^5$ or $C_9$ hydrocarbyl.

6. The polymer of paragraph 1, 2, 3, 4, or 5, wherein $R^1$ is a $C_9$ hydrocarbyl, $R^2$ is a $C_9$ hydrocarbyl, $R^3$ and $R^4$ are H and n is an integer from 1 to 100 (preferably from 1 to 50, preferably from 1 to 50, preferably from 2 to 20, preferably from 4 to 10).

7. The polymer of paragraph 1, 2, 3, 4, or 5, wherein $R^1$ is a $C_5$ hydrocarbyl, $R^2$ is a $C_5$ hydrocarbyl, $R^3$ and $R^4$ are H and n is an integer from 1 to 100 (preferably from 1 to 50, preferably from 1 to 50, preferably from 2 to 20, preferably from 4 to 10).

8. The polymer of any of the above paragraphs 1 to 7, wherein $R^3$ and $R^4$ form cyclopentene.

9. The polymer of any of the above paragraphs 1 to 7, wherein $R^3$ and $R^4$ form cyclopentane.

10. The polymer of paragraph 8 or 9, wherein $R^1$ and $R^2$ are the same and are a $C_{5-9}$ hydrocarbyl.

11. A process to prepare the polymer of any of the above paragraphs 1 to 10, comprising:

contacting an alkene metathesis catalyst with a cyclic olefin and a linear mono-olefin.

12. The process of paragraph 11, wherein the alkene metathesis catalyst is represented by the Formula (I) and/or Formula (V):

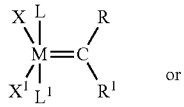

where:

M is a Group 8 metal, preferably Ru or Os, preferably Ru;

X and $X^1$ are, independently, any anionic ligand, preferably a halogen (preferably $C_1$), an alkoxide or a triflate, or X and $X^1$ may be joined to form a dianionic group and may form a single ring of up to 30 non-hydrogen atoms or a multinuclear ring system of up to 30 non-hydrogen atoms;

L and $L^1$ are, independently, a neutral two electron donor, preferably a phosphine or a N-heterocyclic carbene, L and $L^1$ may be joined to form a single ring of up to 30 non-hydrogen atoms or a multinuclear ring system of up to 30 non-hydrogen atoms;

L and X may be joined to form a multidentate monoanionic group and may form a single ring of up to 30 non-hydrogen atoms or a multinuclear ring system of up to 30 non-hydrogen atoms;

$L^1$ and $X^1$ may be joined to form a multidentate monoanionic group and may form a single ring of up to 30 non-hydrogen atoms or a multinuclear ring system of up to 30 non-hydrogen atoms;

R and $R^1$ are, independently, hydrogen or $C_1$ to $C_{30}$ substituted or unsubstituted hydrocarbyl (preferably a $C_1$ to $C_{30}$ substituted or unsubstituted alkyl or a substituted or unsubstituted $C_4$ to $C_{30}$ aryl);

$R^9$ and $R^{10}$ may be different or the same and may be hydrogen, substituted or unsubstituted alkyl, or substituted or unsubstituted aryl;

$R^1$ and $L^1$ or $X^1$ may be joined to form a single ring of up to 30 non-hydrogen atoms or a multinuclear ring system of up to 30 non-hydrogen atoms; and R and L or X may be joined to form a single ring of up to 30 non-hydrogen atoms or a multinuclear ring system of up to 30 non-hydrogen atoms.

13. The process of paragraph 12, wherein:

M is Ru or Os;

X and $X^1$ are, independently, a halogen, an alkoxide or a triflate, or X and $X^1$ may be joined to form a dianionic group and may form a single ring of up to 30 non-hydrogen atoms or a multinuclear ring system of up to 30 non-hydrogen atoms;

L and $L^1$ are, independently, a phosphine or a N-heterocyclic carbene, L and $L^1$ may be joined to form a single ring of up to 30 non-hydrogen atoms or a multinuclear ring system, of up to 30 non-hydrogen atoms;

L and X may be joined to form a multidentate monoanionic group and may form a single ring of up to 30 non-hydrogen atoms or a multinuclear ring system of up to 30 non-hydrogen atoms;

$L^1$ and $X^1$ may be joined to form a multidentate monoanionic group and may form single ring of up to 30 non-hydrogen atoms or a multinuclear ring system of up to 30 non-hydrogen atoms;

R and $R^1$ are, independently, hydrogen or a $C_1$ to $C_{30}$ substituted or unsubstituted alkyl or a substituted or unsubstituted $C_4$ to $C_{30}$ aryl;

$R^1$ and $L^1$ or $X^1$ may be joined to form single ring of up to 30 non-hydrogen atoms or a multinuclear ring system of up to 30 non-hydrogen atoms; and R and L or X may be joined to form single ring of up to 30 non-hydrogen atoms or a multinuclear ring system of up to 30 non-hydrogen atoms.

14. The process of paragraph 11, wherein the alkene metathesis catalyst is one or more of: tricyclohexylphosphine[1,3-bis(2,4,6-trimethylphenyl)imidazol-2-ylidene][3-phenyl-1H-inden-1-ylidene]ruthenium(II) dichloride, tricyclohexylphosphine[3-phenyl-1H-inden-1-ylidene][1,3-bis(2,4,6-trimethylphenyl)-4,5-dihydro-imidazol-2-ylidene]ruthenium(II) dichloride, tricyclohexylphosphine[1,3-bis(2,4,6-trimethylphenyl)-4,5-dihydroimidazol-2-ylidene][(phenylthio)methylene]ruthenium(II) dichloride, bis(tricyclohexylphosphine)-3-phenyl-1H-inden-1-ylideneruthenium(II) dichloride, 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride, [1,3-Bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II) chloride, benzylidene-bis(tricyclohexylphosphine)dichlororuthenium, benzylidene[1,3-bis(2,4,6-trimethylphenyl)-2-imidazolidinylidene]dichloro(tricyclohexylphosphine)ruthenium, dichloro(o-isopropoxyphenylmethylene)(tricyclohexylphosphine)ruthenium(II), (1,3-Bis-(2,4,6-trimethylphenyl)-2-imidazolidinylidene)dichloro(o-isopropoxyphenylmethylene)ruthenium, 1,3-Bis(2-methylphenyl)-2-imidazolidinylidene]dichloro(2-isopropoxyphenylmethylene) ruthenium(II), [1,3-Bis(2,4,6-trimethylphenyl)-2-imidazolidinylidene]dichloro[3-(2-pyridinyl)propylidene]ruthenium(II), [1,3-Bis(2-methylphenyl)-2-imidazolidinylidene]dichloro(phenylmethylene) (tricyclohexylphosphine)ruthenium(II), [1,3-Bis(2,4,6-trimethylphenyl)-2-imidazolidinylidene]dichloro(3-methyl-2-butenylidene) (tricyclohexylphosphine)ruthenium(II), [1,3-Bis(2,4,6-trimethylphenyl)-2-imidazolidinylidene]dichloro(benzylidene)bis(3-bromopyridine)ruthenium(II), 2-(2,6-diethylphenyl)-3,5,5,5-tetramethylpyrrolidine[2-(i-propoxy)-5-(N,N-dimethylaminosulfonyl)phenyl]methylene ruthenium dichloride, 2-(mesityl)-3,3,5,5-tetramethylpyrrolidine[2-(i-propoxy)-5-(N,N-dimethylaminosulfonyl)phenyl]methylene ruthenium dichloride; 2-(2-isopropyl)-3,3,5,5-tetramethylpyrrolidine[2-(i-propoxy)-5-(N,N-dimethylaminosulfonyl)phenyl]methylene ruthenium dichloride, 2-(2,6-diethyl-4-fluorophenyl)-3,3,5,5-tetramethylpyrrolidine[2-(i-propoxy)-5-(N,N-dimethylaminosulfonyl)phenyl]methylene ruthenium dichloride, and (1-cyclohexylmethyl-3-(2,6-diisopropylphenyl)-4,5-dihydro-1H-imadazole) ruthenium (II) chloride and 2-(2,6-diethylphenyl)-3,3,5,5-tetramethylpyrrolidine[2-(i-propoxy)-5-(N,N-dimethylaminosulfonyl)phenyl] methylene ruthenium dichloride.

15. The process of paragraph 11, wherein the alkene metathesis catalyst is represented by the formula:

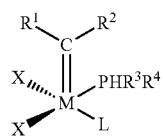

wherein:

M is a Group 8 metal;

each X is independently an anionic ligand;

$R^1$ and $R^2$ are independently selected from the group consisting of hydrogen, a $C_1$ to $C_{30}$ hydrocarbyl, and a $C_1$ to $C_{30}$ substituted hydrocarbyl;

$R^3$ and $R^4$ are independently selected from the group consisting of hydrogen, $C_1$ to $C_{12}$ hydrocarbyl groups, substituted $C_1$ to $C_{12}$ hydrocarbyl groups, and halides; and L is a neutral donor ligand.

16. The process of paragraph 11, wherein the alkene metathesis catalyst is represented by the formula:

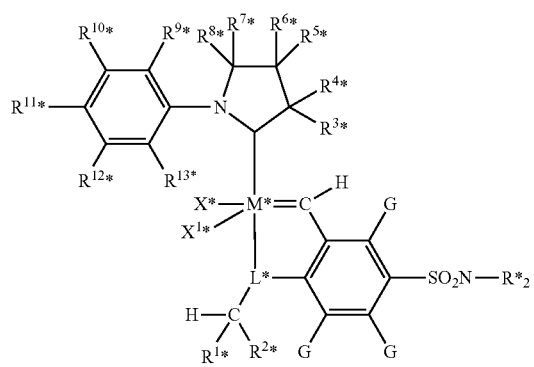

where:

M* is a Group 8 metal;

X* and $X^{1*}$ are, independently, any anionic ligand or X* and $X^{1*}$ may be joined to form a dianionic group and may form single ring of up to 30 non-hydrogen atoms or a multinuclear ring system of up to 30 non-hydrogen atoms;

L* is N—R, O, P—R, or S, (R** is a $C_1$ to $C_{30}$ hydrocarbyl or substituted hydrocarbyl);

R* is hydrogen or a $C_1$ to $C_{30}$ hydrocarbyl or substituted hydrocarbyl;

$R^{1*}$, $R^{2*}$, $R^{3*}$, $R^{4*}$, $R^{5*}$, $R^{6*}$, $R^{7*}$, and $R^{8*}$ are, independently, hydrogen or a $C_1$ to $C_{30}$ hydrocarbyl or substituted hydrocarbyl;

each $R^{9*}$ and $R^{13*}$ are, independently, hydrogen or a $C_1$ to $C_{30}$ hydrocarbyl or substituted hydrocarbyl;

$R^{10*}$, $R^{11*}$, $R^{12*}$ are, independently hydrogen or a $C_1$ to $C_{30}$ hydrocarbyl or substituted hydrocarbyl;

each G, is, independently, hydrogen, halogen or $C_1$ to $C_{30}$ substituted or unsubstituted hydrocarbyl; and where any two adjacent R groups may form a single ring of up to 8 non-hydrogen atoms or a multinuclear ring system of up to 30 non-hydrogen atoms.

17. The process of paragraph 11, wherein the alkene metathesis catalyst is represented by the formula:

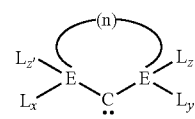

where:

n is a linking group comprising from one to four ring vertices selected from the group consisting of C, Si, N, P, O, and S, with available valences optionally occupied by H, oxo, hydrocarbyl, or substituted hydrocarbyl groups;

each E is independently selected from the group comprising C, N, S, O, and P, with available valences optionally occupied by Lx, Ly, Lz, and Lz'; and Lx, Ly, Lz, and Lz' are independently selected from the group comprising hydrogen, hydrocarbyl groups, and substituted hydrocarbyl groups.

18. The process of any of paragraphs 11 to 17, wherein the linear mono-olefin has from four to twelve carbon atoms.

19. The process of any of paragraphs 11 to 18, wherein the linear mono-olefin is an alpha olefin and/or has an internal olefin (wherein the internal olefin is a cis-isomer or a trans isomer).

20. The process of any of paragraphs 11 to 19, wherein the linear mono-olefin is selected from the group consisting of pentene, hexene, octene, and decene.

21. The process of any of paragraphs 11 to 20, wherein the cyclic olefin is a strained cyclic olefin, preferably a $C_5$ based cyclic olefin, preferably selected from the group consisting of norbornene, norbornadiene, ethylidene norbornene, dicyclopentadiene, and vinyl norbornene.

22. The polymer of any of paragraphs 1 to 10 or produced by the process of any of paragraphs 1 to 21, wherein the polymer has been hydrogenated or functionalized.

23. A lubricant comprising the polymer of any of paragraphs 1 to 10, or produced by the process of any of paragraphs 1 to 21 or paragraph 22.

24. A lubricant base stock comprising the polymer of any of paragraphs 1 to 10, or produced by the process of any of paragraphs 1 to 21 or paragraph 22.

EXPERIMENTAL

Tests and Materials

The following abbreviations are used in the Examples: h is hours, min is minutes.

Gas Chromatography

Gas Chromatography was performed on an Agilent 6890 with a J&W scientific DB-1 column (l=60 m, ID=0.25 mm, film thickness=1 μm) using Chemstation software (Rev. B. 02.01-SR1).

$^1$H NMR

All NMR data was collected on a Bruker Avance III 400 MHz spectrometer running Topspin 3.0 software at room temperature (approx 23° C.). Tetrachloroethane ($d_4$) was used as a solvent (chemical shift of 5.98 ppm was used as a reference) for all materials.

The degree of ROMP vs CM is calculated using the $^1$H NMR spectra. The ratio of the integrals of the methyl and olefinic regions are defined by the following relationship:

$$\frac{\int^1 H_{methyl}}{\int^1 H_{olefin}} = R = \frac{6}{2n+2}$$

Solving for n as a function of R yields the following equation:

$$n = \frac{3-R}{R}$$

This equation is helpful in estimating the size of the polymers generated from the ROMP/CM reaction.

General

All reactions were performed under an inert nitrogen atmosphere. Solvents were anhydrous grade from Sigma Aldrich which were sparged with nitrogen and stored over alumina beads (activated at 300° C.) before use.

Ring-Opening Cross-Metathesis of Norbornene and Trans-5-Decene 2-(2,6-diethylphenyl)-3,3,5,5-tetramethylpyrrolidine[2-(i-propoxy)-5-(N,N-dimethylaminosulfonyl)phenyl]methylene ruthenium dichloride (1.2 mgs) was slurried with 2.0 grams of trans-5-decene. Norbornene (0.3 mLs of a 86.5 wt % toluene solution) was added via syringe. The resulting solution was heated at 40° C. for approximately 12 hours. The resulting solution was exposed to air for one hour and subsequently filtered through a plug of alumina. The excess trans-5-decene was removed under vacuum and the resulting polymer was obtained as a colorless rubbery solid. $^1$H NMR (CDCl$_3$): δ 5.34 (m, 1.0H), 5.24 (m, 0.12H), 5.19 (d, 0.65H), 2.78 (m, 0.77H), 2.42 (m, 1.01H), 1.80 (m, 2.72H), 1.30 (m, 2.40H), 1.04 (m, 0.90H), 0.87 (m, 0.44H). The degree of polymerization was calculated to be 11.3.

Ring Opening Cross-Metathesis of Norbornene and Trans-5-Decene (1-cyclohexylmethyl-3-(2,6-diisopropylphenyl)-4,5-dihydro-1H-imidazole) ruthenium (II) chloride (1.2 mgs) was slurried with 4.8 grams of trans-5-decene. Norbornene (0.5 mLs of a 86.5 wt % toluene solution) was added via syringe. The resulting solution was heated at 40° C. for approximately 2 hours. The resulting solution was exposed to air for one hour and subsequently filtered through a plug of alumina. The excess trans-5-decene was removed under vacuum and the resulting polymer was obtained as a colorless goo. $^1$H NMR (CDCl$_3$): δ 5.34 (m, 1.0H), 5.24 (m, 0.14H), 5.19 (d, 0.51H), 2.78 (m, 0.62H), 2.42 (m, 0.92H), 1.80 (m, 2.71H), 1.30 (m, 2.45H), 1.04 (m, 0.81H), 0.87 (m, 0.63H). The degree of polymerization was calculated to be 7.

ROCM of Dicyclopentadiene and 1-Pentene.

A 3 L reaction vessel was held under vacuum overnight at 70° C. to dry inside of a fume hood. All solvents and reagents were degassed under a stream of $N_2$ and stored under alumina beads prior to use. An oven dried 1000 mL round bottom flask was charged with 400 mL 1-pentene and 331 g dicyclopentadiene (DCPD). The reaction vessel was cooled to 0° C. with an ice bath and the mixture of pentene and DCPD was added via cannula. 450 mL $CH_2Cl_2$ was added via cannula. An oven dried addition funnel was charged in a dry box with a solution of {[2-(i-propoxy)-5-(N,N-dimethylaminosulfonyl)phenyl]methylene}(1,3-bis(2,4,6-trimethylphenyl)-4,5-dihydroimidazol-2-ylidene)ruthenium dichloride (180 mg) in 100 mL $CH_2Cl_2$. The addition funnel was then attached to the reaction apparatus and placed under an atmosphere of $N_2$. The catalyst solution was added to the stirring reaction mixture over 40 min. The slow addition kept the temperature under 25° C. The reaction continued to stir for an additional 1 hour at 0° C. The reaction was then heated to reflux for 4 hours. As the reaction progressed, more heat was required to produce a reflux. However, GC analysis performed at 1 h, 2 h and 4 h did not show any obvious change in conversion. The reaction was then cooled to room temperature and stirred over the weekend.

The reaction mixture was filtered through a plug of silica and the lightest components were removed with a rotovap. The resulting oil was subjected to a Kugelrohr distillation (170° C. @ 60 mTorr (8 Pa)) with 251.6 g remaining in the distillation pot as a yellow oil. An additional 120 g was collected at room temperature, while the material collected at 0° C. was discarded. Heavy Residual Oil: $^1$H NMR—250 MHz (CDCl$_3$): δ 5.9 (m, 1H), 5.2-5.8 (m, 8.2H), 4.9-5.0 (m, 1.9H), 3.25 (m, 1.7H), 2.8 (m, 3.3H), 2.6 (m, 2.8H), 1.75-2.4 (m, 7.8H), 1.5-1.6 (m, 3.4H), 1.0-1.4 (m, 4.9H), 0.88 (m, 3.8H). GCMS: $C_{15}H_{22}$ (9%), $C_{18}H_{28}$ (16%), unknown component (17%), $C_{22}H_{28}$ (11%), $C_{25}H_{34}$ (39%), $C_{28}H_4O$ (2%) Light Oil, (145° C. @ 60 mTorr), $^1$H NMR—250 MHz (CDCl$_3$): δ 5.9 (m, 1H), 5.2-5.8 (m, 4.1H), 4.9-5.0 (m, 2.1H), 3.25 (m, 0.99H), 2.8 (m, 1.3H), 2.6 (m, 1.8H), 1.75-2.4 (m, 4.1H), 1.5-1.6 (m, 1.6H), 1.0-1.4 (m, 3.1H), 0.88 (m, 2.9H). GCMS: $C_{12}H_{16}$ (24%), $C_{15}H_{22}$ (42%), $C_{18}H_{28}$ (21%), unknown component (21%), $C_{22}H_{28}$ (0.5%).

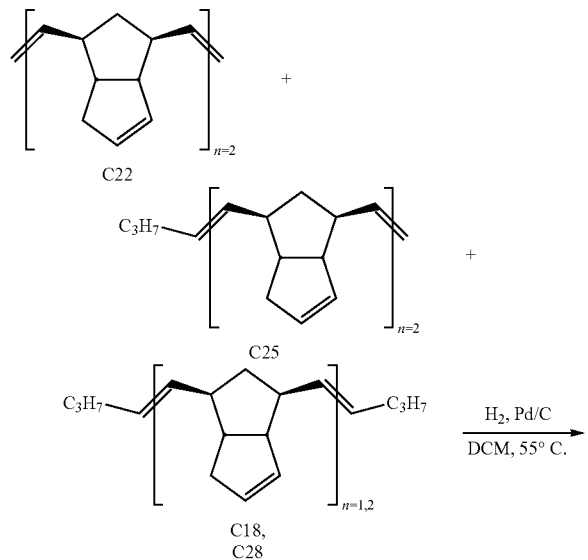

Hydrogenation of ROCM DCPD/1-Pentene Oligomers.

A 400 mL Parr bomb was charged in the drybox with 84.52 g of the heavy material from the preceding reaction. 60 mL hexanes were then added along with 1.95 g of 10% Pd on Carbon. The Parr bomb was charged with approx. 800 psi (5.5 MPa) of H$_2$, heated to 55° C. and allowed to stir for 4.5 hours. As the pressure dropped, the Parr bomb was repressurized repeatedly until the H$_2$ was no longer being consumed. At this point the reaction was deemed to be complete. The Parr bomb was then cooled to room temperature and approx. 30 g of Celite was added to the reaction mixture. The resulting mixture was filtered over a bed of Celite and washed several times with pentane and CH$_2$Cl$_2$. The resulting solution was concentrated over night in vacuo at 35° C. yielding 74 g of a clear, colorless oil. $^1$H NMR—250 MHz (C$_6$D$_6$): δ 2.4 (m, 1.2H), 1.0-2.2 (m, 9.75H), 0.8-1.0 (m, 1.8H). GCMS: $C_{18}H_{34}$ (2%), $C_{22}H_{38}$ (11%), $C_{25}H_{44}$ (79%), $C_{28}H_{50}$ (7%).

ROCM of Dicyclopentadiene and 1-Decene.

Approximately 42.4 g of 1-decene was added to a 3-neck, 500-mL round bottom flask. A solution of 1 mg/mL {[2-(i-propoxy)-5-(N,N-dimethylaminosulfonyl)phenyl]methylene}(1,3-bis(2,4,6-trimethylphenyl)-4,5-dihydroimidazol-2-ylidene)ruthenium dichloride catalyst was obtained. A volume of 5-mL of the ruthenium catalyst was measured and added to 25 mL of dichloromethane. The catalyst in dichloromethane was added to an addition funnel. Approximately 20 g of dicyclopentadiene (DCPD) was weighed and solubilized using dichloromethane and placed into a second addition funnel. The total volume of DCPD and dichloromethane was less than 50 mL. The addition funnel was marked in five approximately equal volumes. The round bottom flask was placed in an oil bath at 50.5° C. (working temperature 50° C. to 52° C.). At the start of the reaction, half of the catalyst in dichloromethane was added to the 1-decene. Immediately following the catalyst addition, DCPD was added drop-wise to the 1-decene. The reaction was then placed in an oil bath at 50° C. An additional 5.0 mL of 1-mg/mL catalyst was added and the reaction was maintained at 50° C. for approximately 24 hours. 26.5 grams of oil were obtained. GC analysis indicated product contained 18 mol % C18 (9-octadecene), 30 mol % C20, and 50 mole %>C20. $^1$H NMR (CDCl$_3$): δ 5.9 (m, 0.31H), 5.7 (m, 1.02H), 5.2-5.6 (m, 3.78H), 5.0 (m, 0.63H), 3.22 (m, 1.0H), 2.8 (m, 1.58H), 2.6 (m, 1.47), 2.25 (m, 2.09H), 2.0 (m, 2.07H), 1.6 (m, 1.06H), 1.1-1.4 (m, 13.1H), 0.88 (t, 3H).

ROMP/CM of 5-Vinyl-2-Norbornene and 1-Decene.

A 70.0 gram amount of 1-decene was weighed and placed in a 500-mL, 3-neck round bottom flask and place in an oil bath at 50° C. A 20 gram amount of 5-vinyl-2-norbornene (VNB) was weighed and placed into an addition funnel. A 5 mg amount {[2-(i-propoxy)-5-(N,N-dimethylaminosulfonyl)phenyl]methylene}(1,3-bis(2,4,6-trimethylphenyl)-4,5-dihydroimidazol-2-ylidene)ruthenium dichloride was dissolved in 1 milliliter of dichloromethane and added to the 1-decene. Vinylnorbornene (VNB) was then added slowly drop-wise into the 1-decene and catalyst solution immediately after the addition of catalyst. The reaction was allowed to stir at 50° C. for 72 hours. Dichloromethane and silica was added to the product, allowed to stir at ambient temperature for 4 hours and filtered using a glass frit to remove the catalyst. Solvent was removed by vacuum and/or evaporated by nitrogen purge. Final weight of the product was 33.74 g (~38% yield). $^1$H NMR (CDCl$_3$): δ 5.75 (m, 0.28H), 5.2-5.6 (m, 2.69H), 4.8-5.0 (m, 0.57H), 2.9 (m, 0.32H), 2.4-2.7 (m, 1.43H), 1.9 (m, 3.10H), 1.5-1.8 (m, 0.57H), 1.29 (m, 13.15H), 0.88 (t, 3H).

Ring Opening Cross Metathesis of Ethylidene Norbornene and 1-Hexene 5 mg of [(HP(C$_4$H$_9$)$_2$)$_2$Ru(C$_5$H$_8$)Cl$_2$] was dissolved using 1 mL of anhydrous, nitrogen-purged toluene. Approximately, 11.7 g of 1-hexene was added to the Ru-catalyst in a 500-mL, 3-neck round bottom flask with stir bar. Approximately 50 g of ethylidenenorbornene (ENB) was added to an addition funnel on the round bottom flask. GC samples of 1-1.5 mL were each taken from the 1-hexene and ENB solutions. The ENB solution was added to the 1-hexene and Ru-catalyst in a drop wise manner. The addition funnel was marked into five approximately equal volumes. After each mark, a GC sample of 1-1.5 mL was taken from the reaction in the round bottom flask. The product sat overnight. Approximately 10 mL of dichloromethane and less than 1 g of silica was added to the product. The solution was stirred for approximately four hours. The solution was filtered using a glass frit with slight vacuum. The resulting solution was then placed in an oil bath at 60° C. overnight with a nitrogen purge. The percent conversion was 65% and includes loss of product during transfer(s).

All documents described herein are incorporated by reference herein for purposes of all jurisdictions where such practice is allowed, including any priority documents, related applications, and/or testing procedures to the extent they are not inconsistent with this text, provided however that any priority document not named in the initially filed application or filing documents is not incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A composition represented by the formula (X):

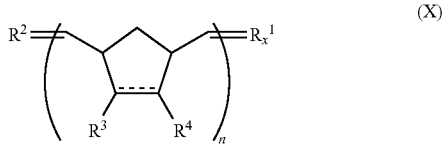

where the dotted line indicates an optional double bond; x is 0 or 1; $R^1$ and $R^2$ can be the same or different and $R^2$ is a hydrocarbyl group having from one to twenty carbon atoms, and $R^1$ is a $C_5$ to $C_{20}$ hydrocarbyl group; $R^3$ and $R^4$ can be the same or different and each is a hydrocarbyl group having from one to forty carbon atoms or $R^3$ and $R^4$ may be represented by the formula (X) above, provided $R^3$ and $R^4$ are joined to form a five-membered or six-membered ring; and n is an integer from 2 to 100, wherein said composition has an Mn of less than 25,000 g/mol.

2. A composition represented by the formula (X):

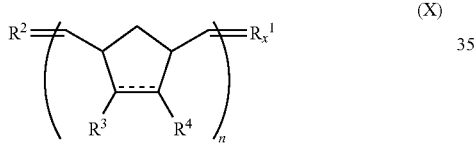

where the dotted line indicates an optional double bond; x is 0 or 1; $R^1$ and $R^2$ can be the same or different and $R^2$ is an alkyl group having from five to twelve carbon atoms, and $R^1$ is a $C_5$ to $C_{12}$ alkyl group; $R^3$ and $R^4$ can be the same or different and each is hydrogen or a hydrocarbyl group having from one to forty carbon atoms or $R^3$ and $R^4$ may be represented by the formula (X) above, provided $R^3$ and $R^4$ may be joined to form a five-membered or six-membered ring; and n is an integer from 2 to 100, wherein said composition has an Mn of less than 25,000 g/mol.

3. The composition of claim 1, wherein $R^1$ is different from $R^2$.

4. The composition of claim 1, wherein each of $R^3$ and $R^4$ is a $C_1$ to $C_{20}$ hydrocarbyl group.

5. A composition represented by the formula (X):

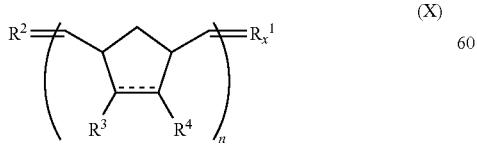

where the dotted line indicates an optional double bond; x is 0 or 1; $R^1$ and $R^2$ can be the same or different and $R^2$ is a hydrocarbyl group having from one to twenty carbon atoms, and $R^1$ is a $C_5$ to $C_{20}$ hydrocarbyl group; $R^3$ is hydrogen and $R^4$ is an ethylidene group; and n is an integer from 2 to 100, wherein said composition has an Mn of less than 25,000 g/mol.

6. The composition of claim 1, wherein each pentane ring is saturated.

7. The composition of claim 1, wherein $R^1$ and $R^2$ can be the same or different and each is a hydrocarbyl group having from 5 to 20 carbon atoms; $R^3$ and $R^4$ can be the same or different and each is a hydrocarbyl group having from 1 to 20 carbon atoms, provided $R^3$ and $R^4$ are joined to form a five-membered or six-membered ring; and n is an integer from 2 to 60.

8. A composition represented by the formula (X):

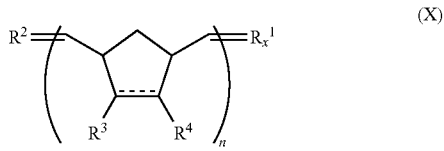

where the dotted line indicates an optional double bond; x is 0 or 1; $R^1$ and $R^2$ can be the same or different and $R^1$ is a $C_{5-9}$ hydrocarbyl and $R^2$ is a $C_{5-9}$ hydrocarbyl; $R^3$ and $R^4$ can be the same or different and each is hydrogen or a hydrocarbyl group having from one to forty carbon atoms or $R^3$ and $R^4$ may be represented by the formula (X) above, provided $R^3$ and $R^4$ may be joined to form a five-membered or six-membered ring; and n is an integer from 1 to 100, wherein said composition has an Mn of less than 25,000 g/mol.

9. The composition of claim 1, wherein $R^3$ and $R^4$ form cyclopentene and/or cyclopentane.

10. A process for producing a composition represented by the formula (X):

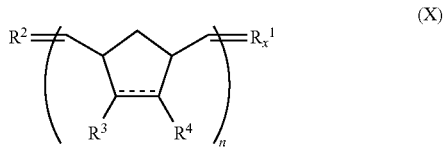

where the dotted line indicates an optional double bond; x is 0 or 1; $R^1$ and $R^2$ can be the same or different and each is a hydrocarbyl group having from one to twenty carbon atoms; $R^3$ and $R^4$ can be the same or different and each is hydrogen or a hydrocarbyl group having from one to forty carbon atoms or $R^3$ and $R^4$ may be represented by the formula (X) above, provided $R^3$ and $R^4$ may be joined to form a five-membered or six-membered ring; and n is an integer from 2 to 100;

the process comprising contacting at least one $C_5$ based cyclic olefin with at least one linear mono-olefin having from two to twenty carbon atoms in the presence of an alkene metathesis catalyst, wherein the ratio of linear mono-olefin monomer to cyclic olefin monomer is 1:1 to 1000:1.

11. The process of claim 10, wherein the linear mono-olefin has from four to twelve carbon atoms.

12. The process of claim 10, wherein the linear mono-olefin is an alpha olefin.

13. A process for producing a composition represented by the formula (X):

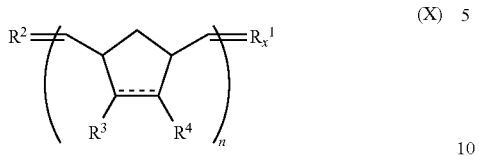

where the dotted line indicates an optional double bond; x is 0 or 1; $R^1$ and $R^2$ can be the same or different and each is a hydrocarbyl group having from one to twenty carbon atoms; $R^3$ and $R^4$ can be the same or different and each is hydrogen or a hydrocarbyl group having from one to forty carbon atoms or $R^3$ and $R^4$ may be represented by the formula (X) above, provided $R^3$ and $R^4$ may be joined to form a five-membered or six-membered ring; and n is an integer from 1 to 100;
the process comprising contacting at least one $C_5$ based cyclic olefin with at least one linear mono-olefin having from two to twenty carbon atoms in the presence of an alkene metathesis catalyst, wherein the ratio of linear mono-olefin monomer to cyclic olefin monomer is 1:1 to 1000:1, wherein the double bond in the linear mono-olefin is an internal double bond.

14. The process of claim 13, wherein the internal olefin is a cis-isomer.

15. A process for producing a composition represented by the formula (X):

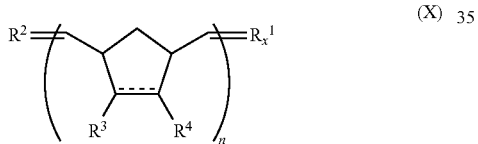

where the dotted line indicates an optional double bond; x is 0 or 1; $R^1$ and $R^2$ can be the same or different and each is a hydrocarbyl group having from one to twenty carbon atoms; $R^3$ and $R^4$ can be the same or different and each is hydrogen or a hydrocarbyl group having from one to forty carbon atoms or $R^3$ and $R^4$ may be represented by the formula (X) above, provided $R^3$ and $R^4$ may be joined to form a five-membered or six-membered ring; and n is an integer from 1 to 100;
the process comprising contacting at least one $C_5$ based cyclic olefin with at least one linear mono-olefin having from two to twenty carbon atoms in the presence of an alkene metathesis catalyst, wherein the ratio of linear mono-olefin monomer to cyclic olefin monomer is 1:1 to 1000:1, wherein the alkene metathesis catalyst is selected from (1-cyclohexylmethyl-3-(2,6-diisopropylphenyl)-4,5-dihydro-1H-imadazole) ruthenium (II) chloride and 2-(2,6-diethylphenyl)-3,3,5,5-tetramethylpyrrolidine methylene ruthenium dichloride.

16. The process of claim 10, wherein the cyclic olefin is selected from the group consisting of norbornene, norbornadiene, ethylidene norbornene, dicyclopentadiene, and vinyl norbornene.

17. The process of claim 10, wherein the linear mono-olefin is selected from the group consisting of pentene, hexene, octene, and decene.

18. A process for producing a composition represented by the formula (X):

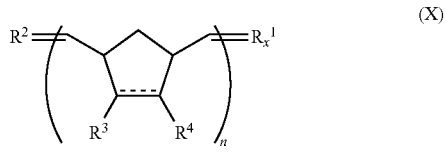

where the dotted line indicates an optional double bond; x is 0 or 1; $R^1$ and $R^2$ can be the same or different and each is a hydrocarbyl group having from one to twenty carbon atoms; $R^3$ and $R^4$ can be the same or different and each is hydrogen or a hydrocarbyl group having from one to forty carbon atoms or $R^3$ and $R^4$ may be represented by the formula (X) above, provided $R^3$ and $R^4$ may be joined to form a five-membered or six-membered ring; and n is an integer from 1 to 100;
the process comprising contacting at least one $C_5$ based cyclic olefin with at least one linear mono-olefin having from two to twenty carbon atoms in the presence of an alkene metathesis catalyst, wherein the ratio of linear mono-olefin monomer to cyclic olefin monomer is 1:1 to 1000:1, wherein the alkene metathesis catalyst is represented by the Formula (I):

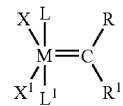

Formula (I)

where:
M is a Group 8 metal;
X and $X^1$ are, independently, any anionic ligand, or X and $X^1$ may be joined to form a dianionic group and may form a single ring of up to 30 non-hydrogen atoms or a multinuclear ring system of up to 30 non-hydrogen atoms;
L and $L^1$ are neutral two electron donors, L and $L^1$ may be joined to form a single ring of up to 30 non-hydrogen atoms or a multinuclear ring system of up to 30 non-hydrogen atoms;
L and X may be joined to form a bidentate monoanionic group and may form a single ring of up to 30 non-hydrogen atoms or a multinuclear ring system of up to 30 non-hydrogen atoms;
$L^1$ and $X^1$ may be joined to form a multidentate monoanionic group and may form a single ring of up to 30 non-hydrogen atoms or a multinuclear ring system of up to 30 non-hydrogen atoms;
R and $R^1$ are, independently, hydrogen or $C_1$ to $C_{30}$ substituted or unsubstituted hydrocarbyl;
$R^1$ and $L^1$ or $X^1$ may be joined to form a single ring of up to 30 non-hydrogen atoms or a multinuclear ring system of up to 30 non-hydrogen atoms; and
R and L or X may be joined to form a single ring of up to 30 non-hydrogen atoms or a multinuclear ring system of up to 30 non-hydrogen atoms.

19. The process of claim 18, wherein:
M is Ru or Os;
X and $X^1$ are, independently, a halogen, an alkoxide or a triflate, or X and $X^1$ may be joined to form a dianionic group and may form a single ring of up to 30 non-hydrogen atoms or a multinuclear ring system of up to 30 non-hydrogen atoms;

$L$ and $L^1$ are, independently, a phosphine or a N-heterocyclic carbene, $L$ and $L^1$ may be joined to form a single ring of up to 30 non-hydrogen atoms or a multinuclear ring system, of up to 30 non-hydrogen atoms;

$L$ and $X$ may be joined to form a multidentate monoanionic group and may form a single ring of up to 30 non-hydrogen atoms or a multinuclear ring system of up to 30 non-hydrogen atoms;

$L^1$ and $X^1$ may be joined to form a multidentate monoanionic group and may form a single ring of up to 30 non-hydrogen atoms or a multinuclear ring system of up to 30 non-hydrogen atoms;

R and $R^1$ are, independently, hydrogen or a $C_1$ to $C_{30}$ substituted or unsubstituted alkyl or a substituted or unsubstituted $C_4$ to $C_{30}$ aryl;

$R^1$ and $L^1$ or $X^1$ may be joined to form a single ring of up to 30 non-hydrogen atoms or a multinuclear ring system of up to 30 non-hydrogen atoms; and R and L or X may be joined to form a single ring of up to 30 non-hydrogen atoms or a multinuclear ring system of up to 30 non-hydrogen atoms.

20. A process for producing a composition represented by the formula (X):

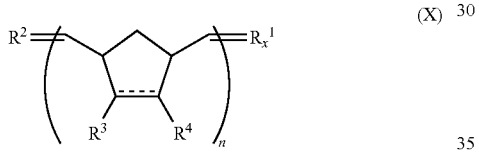

where the dotted line indicates an optional double bond; x is 0 or 1; $R^1$ and $R^2$ can be the same or different and each is a hydrocarbyl group having from one to twenty carbon atoms; $R^3$ and $R^4$ can be the same or different and each is hydrogen or a hydrocarbyl group having from one to forty carbon atoms or $R^3$ and $R^4$ may be represented by the formula (X) above, provided $R^3$ and $R^4$ may be joined to form a five-membered or six-membered ring; and n is an integer from 1 to 100;

the process comprising contacting at least one $C_5$ based cyclic olefin with at least one linear mono-olefin having from two to twenty carbon atoms in the presence of an alkene metathesis catalyst, wherein the ratio of linear mono-olefin monomer to cyclic olefin monomer is 1:1 to 1000:1, wherein the alkene metathesis catalyst is one or more of:

tricyclohexylphosphine[1,3-bis(2,4,6-trimethylphenyl) imidazol-2-ylidene][3-phenyl-1H-inden-1-ylidene]ruthenium(II) dichloride, tricyclohexylphosphine[3-phenyl-1H-inden-1-ylidene][1,3-bis(2,4,6-trimethylphenyl)-4,5-dihydro-imidazol-2-ylidene]ruthenium(II) dichloride, tricyclohexylphosphine[1,3-bis(2,4,6-trimethylphenyl)-4,5-dihydroimidazol-2-ylidene][(phenylthio)methylene] ruthenium(II) dichloride, bis(tricyclohexylphosphine)-3-phenyl-1H-inden-1-ylideneruthenium(II) dichloride, 1,3-Bis(2,4,6-trimethylphenyl)-4,5-dihydroimidazol-2-ylidene[2-(i-propoxy)-5-(N,N-dimethylaminosulfonyl) phenyl]methyleneruthenium(II) dichloride,

[1,3-Bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II) chloride, benzylidene-bis(tricyclohexylphosphine)dichlororuthenium, benzylidene[1,3-bis(2,4,6-trimethylphenyl)-2-imidazolidinylidene]dichloro(tricyclohexylphosphine)ruthenium, dichloro(o-isopropoxyphenylmethylene)(tricyclohexylphosphine)ruthenium(II), (1,3-Bis-(2,4,6-trimethylphenyl)-2-imidazolidinylidene) dichloro(o-isopropoxyphenylmethylene)ruthenium, 1,3-Bis(2-methylphenyl)-2-imidazolidinylidene]dichloro (2-isopropoxyphenylmethylene) ruthenium(II),

[1,3-Bis(2,4,6-trimethylphenyl)-2-imidazolidinylidene] dichloro[3-(2-pyridinyl)propylidene]ruthenium(II),

[1,3-Bis(2-methylphenyl)-2-imidazolidinylidene] dichloro(phenylmethylene) (tricyclohexylphosphine) ruthenium(II),

[1,3-Bis(2,4,6-trimethylphenyl)-2-imidazolidinylidene] dichloro(3-methyl-2-butenylidene) (tricyclohexylphosphine)ruthenium(II),

[1,3-Bis(2,4,6-trimethylphenyl)-2-imidazolidinylidene] dichloro(benzylidene)bis(3-bromopyridine)ruthenium (II), 2-(2,6-diethylphenyl)-3,5,5,5-tetramethylpyrrolidine[2-(i-propoxy)-5-(N,N-dimethylaminosulfonyl)phenyl] methylene ruthenium dichloride, 2-(mesityl)-3,3,5,5-tetramethylpyrrolidine[2-(i-propoxy)-5-(N,N-dimethylaminosulfonyl)phenyl]methylene ruthenium dichloride;

2-(2-isopropyl)-3,3,5,5-tetramethylpyrrolidine[2-(i-propoxy)-5-(N,N-dimethylaminosulfonyl)phenyl]methylene ruthenium dichloride, and 2-(2,6-diethyl-4-fluorophenyl)-3,3,5,5-tetramethylpyrrolidine[2-(i-propoxy)-5-(N,N-dimethylaminosulfonyl) phenyl]methylene ruthenium dichloride.

21. The process of claim 10, wherein the alkene metathesis catalyst is represented by the formula:

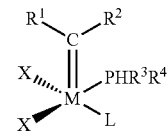

wherein:

M is a Group 8 metal;

each X is independently an anionic ligand;

$R^1$ and $R^2$ are independently selected from the group consisting of hydrogen, a $C_1$ to $C_{30}$ hydrocarbyl, and a $C_1$ to $C_{30}$ substituted hydrocarbyl;

$R^3$ and $R^4$ are independently selected from the group consisting of hydrogen, $C_1$ to $C_{12}$ hydrocarbyl groups, substituted $C_1$ to $C_{12}$ hydrocarbyl groups, and halides; and L is a neutral donor ligand.

22. A process for producing a composition represented by the formula (X):

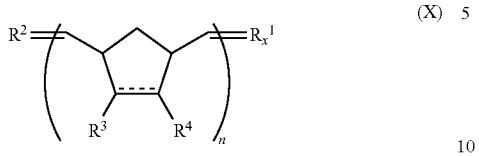

where the dotted line indicates an optional double bond; x is 0 or 1; $R^1$ and $R^2$ can be the same or different and each is a hydrocarbyl group having from one to twenty carbon atoms; $R^3$ and $R^4$ can be the same or different and each is hydrogen or a hydrocarbyl group having from one to forty carbon atoms or $R^3$ and $R^4$ may be represented by the formula (X) above, provided $R^3$ and $R^4$ may be joined to form a five-membered or six-membered ring; and n is an integer from 1 to 100;

the process comprising contacting at least one $C_5$ based cyclic olefin with at least one linear mono-olefin having from two to twenty carbon atoms in the presence of an alkene metathesis catalyst, wherein the ratio of linear mono-olefin monomer to cyclic olefin monomer is 1:1 to 1000:1, wherein the alkene metathesis catalyst is represented by the formula:

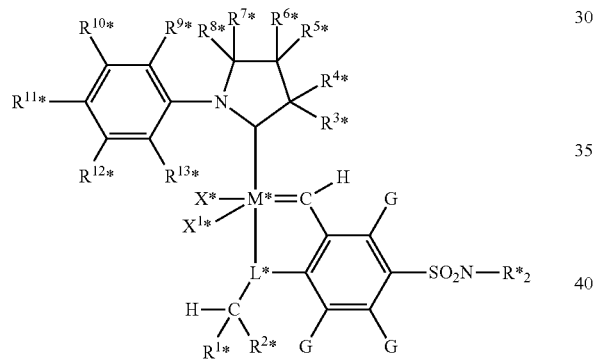

where:

M* is a Group 8 metal;

X* and $X^{1*}$ are, independently, any anionic ligand or X* and $X^{1*}$ may be joined to form a dianionic group and may form a single ring of up to 30 non-hydrogen atoms or a multinuclear ring system of up to 30 non-hydrogen atoms;

L* is N—R, O, P—R, or S, (R** is a $C_1$ to $C_{30}$ hydrocarbyl or substituted hydrocarbyl);

R* is hydrogen or a $C_1$ to $C_{30}$ hydrocarbyl or substituted hydrocarbyl;

$R^{1*}$, $R^{2*}$, $R^{3*}$, $R^{4*}$, $R^{5*}$, $R^{6*}$, $R^{7*}$, and $R^{8*}$ are, independently, hydrogen or a $C_1$ to $C_{30}$ hydrocarbyl or substituted hydrocarbyl;

each $R^{9*}$ and $R^{13*}$ are, independently, hydrogen or a $C_1$ to $C_{30}$ hydrocarbyl or substituted hydrocarbyl;

$R^{10*}$, $R^{11*}$, $R^{12*}$ are, independently hydrogen or a $C_1$ to $C_{30}$ hydrocarbyl or substituted hydrocarbyl;

each G, is, independently, hydrogen, halogen or $C_1$ to $C_{30}$ substituted or unsubstituted hydrocarbyl; and where any two adjacent R groups may form a single ring of up to 8 non-hydrogen atoms or a multinuclear ring system of up to 30 non-hydrogen atoms.

23. A process for producing a composition represented by the formula (X):

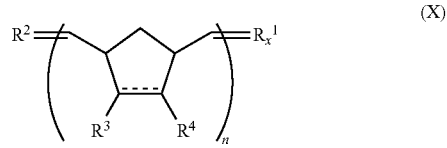

where the dotted line indicates an optional double bond; x is 0 or 1; $R^1$ and $R^2$ can be the same or different and each is a hydrocarbyl group having from one to twenty carbon atoms; $R^3$ and $R^4$ can be the same or different and each is hydrogen or a hydrocarbyl group having from one to forty carbon atoms or $R^3$ and $R^4$ may be represented by the formula (X) above, provided $R^3$ and $R^4$ may be joined to form a five-membered or six-membered ring; and n is an integer from 1 to 100;

the process comprising contacting at least one $C_5$ based cyclic olefin with at least one linear mono-olefin having from two to twenty carbon atoms in the presence of an alkene metathesis catalyst, wherein the ratio of linear mono-olefin monomer to cyclic olefin monomer is 1:1 to 1000:1, wherein the alkene metathesis catalyst is represented by the formula:

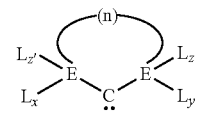

where:

n is a linking group comprising from one to four ring vertices selected from the group consisting of C, Si, N, P, O, and S, with available valences optionally occupied by H, oxo, hydrocarbyl, or substituted hydrocarbyl groups;

each E is independently selected from the group comprising C, N, S, O, and P, with available valences optionally occupied by Lx, Ly, Lz, and Lz'; and Lx, Ly, Lz, and Lz' are independently selected from the group consisting of hydrogen, hydrocarbyl groups, and substituted hydrocarbyl groups.

24. A lubricant or lubricant base stock comprising a composition represented by the formula (X):

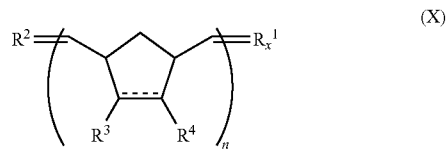

where the dotted line indicates an optional double bond; x is 0 or 1; $R^1$ and $R^2$ can be the same or different and each is a hydrocarbyl group having from one to twenty carbon atoms; $R^3$ and $R^4$ can be the same or different and each is hydrogen or a hydrocarbyl group having from one to forty carbon atoms or $R^3$ and $R^4$ may be represented by the formula (X) above, provided $R^3$ and $R^4$ may be joined to form a five-membered or six-membered ring; and n is an integer from 1 to 100.

25. A composition comprising the reaction product from contacting a composition represented by the formula (X):

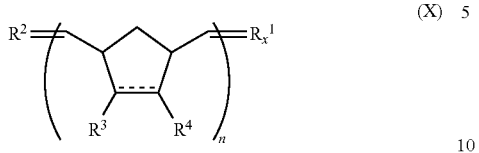

where the dotted line indicates an optional double bond; x is 0 or 1; $R^1$ and $R^2$ can be the same or different and each is a hydrocarbyl group having from one to twenty carbon atoms; $R^3$ and $R^4$ can be the same or different and each is hydrogen or a hydrocarbyl group having from one to forty carbon atoms or $R^3$ and $R^4$ may be represented by the formula (X) above, provided $R^3$ and $R^4$ may be joined to form a five-membered or six-membered ring; and n is an integer from 1 to 100, with hydrogen and a hydrogenation catalyst.

26. A lubricant or lubricant base stock comprising the composition of claim 25.

27. A composition represented by the formula (X):

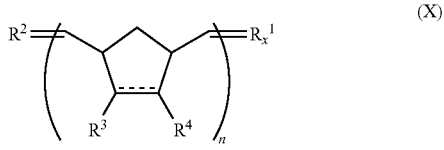

where the dotted line indicates an optional double bond; x is 0 or 1; $R^1$ and $R^2$ can be the same or different and each is a hydrocarbyl group having from one to twenty carbon atoms, provided that when $R^2$ is a hydrocarbyl group having one carbon atom $R^1$ is different from $R^2$, and when $R^2$ is a hydrocarbyl group having four carbon atoms $R^1$ is different from $R^2$; and $R^3$ and $R^4$ can be the same or different and each is a hydrocarbyl group having from one to forty carbon atoms or $R^3$ and $R^4$ may be represented by the formula (X) above, provided $R^3$ and $R^4$ are joined to form a five-membered or six-membered ring; and n is an integer from 2 to 100.

28. The composition of claim 27, wherein each of $R^1$ and $R^2$ is an alkyl group having from five to twelve carbon atoms.

29. The composition of claim 27, wherein $R^2$ is an alkyl group having one to six carbon atoms.

30. The composition of claim 27, wherein each of $R^3$ and $R^4$ is a $C_1$ to $C_{20}$ hydrocarbyl group.

31. The composition of claim 27, wherein $R^3$ and $R^4$ form a cyclic group.

32. A composition represented by the formula (X):

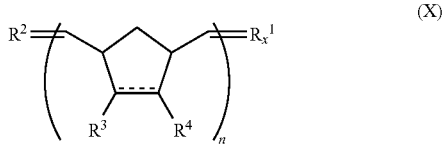

where the dotted line indicates an optional double bond; x is 0 or 1; $R^1$ and $R^2$ can be the same or different and each is a hydrocarbyl group having from one to twenty carbon atoms, provided that when $R^2$ is a hydrocarbyl group having one carbon atom $R^1$ is different from $R^2$, and when $R^2$ is a hydrocarbyl group having four carbon atoms $R^1$ is different from $R^2$; and $R^3$ and $R^4$ can be the same or different and each is hydrogen or a hydrocarbyl group having from one to forty carbon atoms or $R^3$ and $R^4$ may be represented by the formula (X) above, provided $R^3$ and $R^4$ may be joined to form a five-membered or six-membered ring; and n is an integer from 2 to 60.

33. A composition represented by the formula (X):

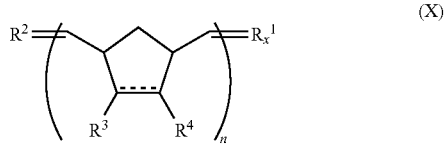

where the dotted line indicates an optional double bond; x is 0 or 1; $R^1$ and $R^2$ can be the same or different and $R^1$ is a $C_{5-9}$ hydrocarbyl and $R^2$ is a $C_{5-9}$ hydrocarbyl, and $R^3$ and $R^4$ can be the same or different and each is hydrogen or a hydrocarbyl group having from one to forty carbon atoms or $R^3$ and $R^4$ may be represented by the formula (X) above, provided $R^3$ and $R^4$ may be joined to form a five-membered or six-membered ring; and n is an integer from 1 to 100.

34. A composition comprising the reaction product from contacting a composition represented by the formula (X):

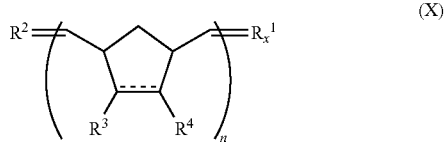

where the dotted line indicates an optional double bond; x is 0 or 1; $R^1$ and $R^2$ can be the same or different and each is a hydrocarbyl group having from one to twenty carbon atoms; $R^3$ and $R^4$ can be the same or different and each is hydrogen or a hydrocarbyl group having from one to forty carbon atoms or $R^3$ and $R^4$ may be represented by the formula (X) above, provided $R^3$ and $R^4$ may be joined to form a five-membered or six-membered ring; and n is an integer from 1 to 100, with a heteroatom containing group.

35. The composition of claim 34, wherein the heteroatom containing group is selected from the group consisting of amines, aldehydes, alcohols, acids, succinic acid, maleic acid, and maleic anhydride.

36. A lubricant or lubricant base stock comprising the composition of claim 34.

37. The composition of claim 27, where the composition represented by formula (X) has an Mn of less than 25,000 g/mol.

38. The process of claim 10 where the composition represented by formula (X) has an Mn of less than 25,000 g/mol.

39. The composition of claim 27 wherein $R^3$ and $R^4$ can be the same or different and each is a hydrocarbyl group having from one to forty carbon atoms, provided that $R^3$ and $R^4$ are joined to form a five-membered or six-membered ring.

40. The composition of claim 8, where n is 2 to 100.
41. The process of claim 10, where n is 2 to 5.
42. The process of claim 13, where n is 2 to 100.
43. The process of claim 15, where n is 2 to 100.
44. The process of claim 18, where n is 2 to 100.
45. The process of claim 20, where n is 2 to 100.
46. The process of claim 22, where n is 2 to 100.
47. The process of claim 23, where n is 2 to 100.
48. The composition of claim 24, where n is 2 to 100.
49. The composition of claim 25, where n is 2 to 100.
50. The composition of claim 33, where n is 2 to 100.
51. The composition of claim 34, where n is 2 to 100.
52. The composition of claim 8, wherein $R^3$ and $R^4$ can be the same or different and each is a hydrocarbyl group having from one to forty carbon atoms or $R^3$ and $R^4$ may be represented by the formula (X) above, provided $R^3$ and $R^4$ are joined to form a five-membered or six-membered ring.
53. The process of claim 10, wherein $R^3$ and $R^4$ can be the same or different and each is a hydrocarbyl group having from one to forty carbon atoms or $R^3$ and $R^4$ may be represented by the formula (X) above, provided $R^3$ and $R^4$ are joined to form a five-membered or six-membered ring.
54. The process of claim 13, wherein $R^3$ and $R^4$ can be the same or different and each is a hydrocarbyl group having from one to forty carbon atoms or $R^3$ and $R^4$ may be represented by the formula (X) above, provided $R^3$ and $R^4$ are joined to form a five-membered or six-membered ring.
55. The process of claim 15, wherein $R^3$ and $R^4$ can be the same or different and each is a hydrocarbyl group having from one to forty carbon atoms or $R^3$ and $R^4$ may be represented by the formula (X) above, provided $R^3$ and $R^4$ are joined to form a five-membered or six-membered ring.
56. The process of claim 18, wherein $R^3$ and $R^4$ can be the same or different and each is a hydrocarbyl group having from one to forty carbon atoms or $R^3$ and $R^4$ may be represented by the formula (X) above, provided $R^3$ and $R^4$ are joined to form a five-membered or six-membered ring.
57. The process of claim 20, wherein $R^3$ and $R^4$ can be the same or different and each is a hydrocarbyl group having from one to forty carbon atoms or $R^3$ and $R^4$ may be represented by the formula (X) above, provided $R^3$ and $R^4$ are joined to form a five-membered or six-membered ring.
58. The process of claim 22, wherein $R^3$ and $R^4$ can be the same or different and each is a hydrocarbyl group having from one to forty carbon atoms or $R^3$ and $R^4$ may be represented by the formula (X) above, provided $R^3$ and $R^4$ are joined to form a five-membered or six-membered ring.
59. The process of claim 23, wherein $R^3$ and $R^4$ can be the same or different and each is a hydrocarbyl group having from one to forty carbon atoms or $R^3$ and $R^4$ may be represented by the formula (X) above, provided $R^3$ and $R^4$ are joined to form a five-membered or six-membered ring.
60. The composition of claim 24, wherein $R^3$ and $R^4$ can be the same or different and each is a hydrocarbyl group having from one to forty carbon atoms or $R^3$ and $R^4$ may be represented by the formula (X) above, provided $R^3$ and $R^4$ are joined to form a five-membered or six-membered ring.
61. The composition of claim 25, wherein $R^3$ and $R^4$ can be the same or different and each is a hydrocarbyl group having from one to forty carbon atoms or $R^3$ and $R^4$ may be represented by the formula (X) above, provided $R^3$ and $R^4$ are joined to form a five-membered or six-membered ring.
62. The composition of claim 33, wherein $R^3$ and $R^4$ can be the same or different and each is a hydrocarbyl group having from one to forty carbon atoms or $R^3$ and $R^4$ may be represented by the formula (X) above, provided $R^3$ and $R^4$ are joined to form a five-membered or six-membered ring.
63. The composition of claim 34, wherein $R^3$ and $R^4$ can be the same or different and each is a hydrocarbyl group having from one to forty carbon atoms or $R^3$ and $R^4$ may be represented by the formula (X) above, provided $R^3$ and $R^4$ are joined to form a five-membered or six-membered ring.

\* \* \* \* \*